(12) United States Patent
Golparian

(10) Patent No.: US 10,287,875 B2
(45) Date of Patent: May 14, 2019

(54) SCALABLE BOREHOLE ACQUISITION SYSTEM

(71) Applicant: Schlumberger Technology Corporation, Sugar Land, TX (US)

(72) Inventor: Daniel Golparian, Minato-Ku (JP)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 131 days.

(21) Appl. No.: 14/945,313

(22) Filed: Nov. 18, 2015

(65) Prior Publication Data

US 2016/0168983 A1 Jun. 16, 2016

Related U.S. Application Data

(60) Provisional application No. 62/090,874, filed on Dec. 11, 2014.

(51) Int. Cl.
| | |
|---|---|
| *G01V 1/16* | (2006.01) |
| *G01V 1/40* | (2006.01) |
| *E21B 47/14* | (2006.01) |
| *G01V 1/22* | (2006.01) |
| *G01V 1/42* | (2006.01) |

(52) U.S. Cl.
CPC .............. *E21B 47/14* (2013.01); *G01V 1/168* (2013.01); *G01V 1/22* (2013.01); *G01V 1/42* (2013.01); *G01V 1/16* (2013.01)

(58) Field of Classification Search
CPC .......... E21B 47/14; G01V 1/168; G01V 1/42; G01V 1/22; G01V 1/16
USPC ...................................................... 367/25, 81
See application file for complete search history.

(56) References Cited

U.S. PATENT DOCUMENTS

| | | | | |
|---|---|---|---|---|
| 7,223,962 | B2 * | 5/2007 | Fageraas .................. | G01V 1/22 250/227.14 |
| 7,535,795 | B2 * | 5/2009 | Varsamis ............. | G01V 11/002 340/853.3 |
| 7,537,053 | B1 * | 5/2009 | Hall .................... | E21B 41/0085 166/242.6 |
| 8,605,544 | B1 * | 12/2013 | Baig ...................... | G01V 1/003 367/14 |

* cited by examiner

*Primary Examiner* — Daniel L Murphy
(74) *Attorney, Agent, or Firm* — Eileen Pape

(57) ABSTRACT

A method that is usable with a well includes deploying microelectromechanical system (MEMS)-based seismic receivers in the well and using the MEMS-based receivers to acquire data indicative of seismic energy.

20 Claims, 18 Drawing Sheets

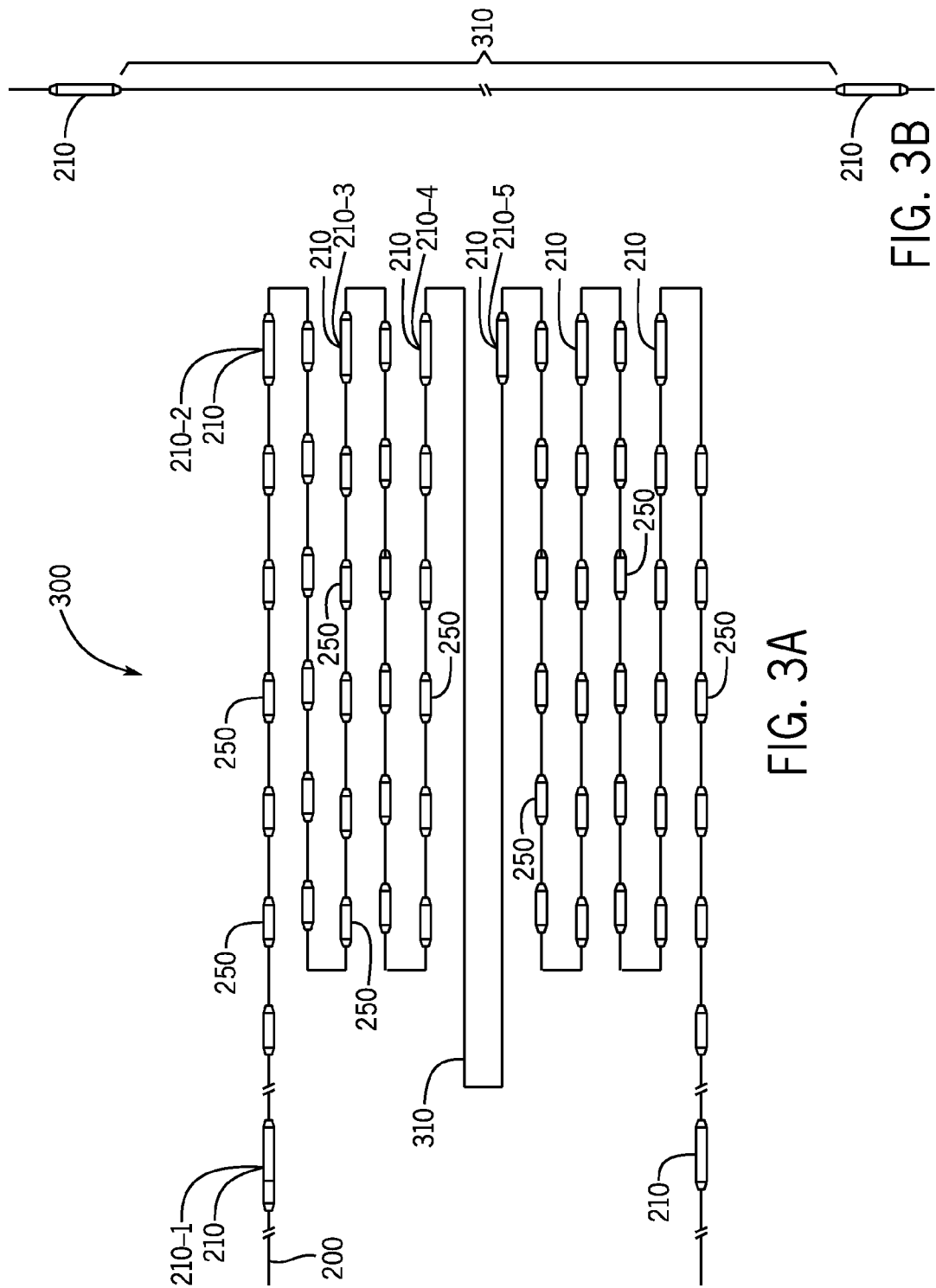

SCALABLE BOREHOLE ACQUISITION SYSTEM

RELATED APPLICATIONS

This application claims the benefit of a related U.S. Provisional Application Ser. No. 62/090,874 filed Dec. 11, 2014, entitled "Scalable Borehole Acquisition System," to Daniel GOLPARIAN, the disclosure of which is incorporated by reference herein in its entirety.

BACKGROUND

The following descriptions and examples are not admitted to be prior art by virtue of their inclusion in this section.

Seismic exploration involves surveying subterranean geological formations for hydrocarbon deposits. A survey typically involves deploying seismic source(s) and seismic sensors at predetermined locations. The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones), others to particle motion (e.g., geophones), and industrial surveys may deploy only one type of sensor, both hydrophones and geophones, and/or other suitable sensor types. A typical measurement acquired by a sensor contains desired signal content (a measured pressure or particle motion, for example) and an unwanted content (or "noise").

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In an example implementation, a method that is usable with a well includes deploying microelectromechanical system (MEMS)-based seismic receivers in the well and using the MEMS-based receivers to acquire data indicative of seismic energy.

In another example implementation, a system that is usable with a well includes a telemetry network, seismic receivers arranged in groups and concentrators associated with the groups of seismic receivers. A given concentrator is adapted to acquire data from an associated group of seismic receivers and introduce the data to the telemetry network at a node of the telemetry network.

In another example implementation, a method that is usable with a well includes unwinding a plurality of receiver reels, where the unwinding includes, for each receiver reel, unwinding a cable section that includes a concentrator and a plurality of seismic receivers for which the concentrator acquires data and introduces the data at a node of a telemetry network. The method includes deploying the cable sections into the well as the cable sections are unwound; deploying a telemetry interface to the uppermost cable of the uppermost receiver reel after the receiver reels are deployed; and deploying a telemetry cable for communication between the concentrators and equipment outside of the well.

In another example implementation, an apparatus that is usable with a well includes a cable that is adapted to be deployed in the well and microelectromechanical systems (MEMS)-based seismic sensors that are disposed on the cable.

Advantages and other desired features will become apparent from the following drawings, description and claims.

BRIEF DESCRIPTION OF THE DRAWINGS

FIGS. 3A and 3B are schematic diagrams of a section of the scalable borehole acquisition system illustrating a designed gap between adjacent concentrators of the system according to an example implementation.

DETAILED DESCRIPTION

Figure 1:
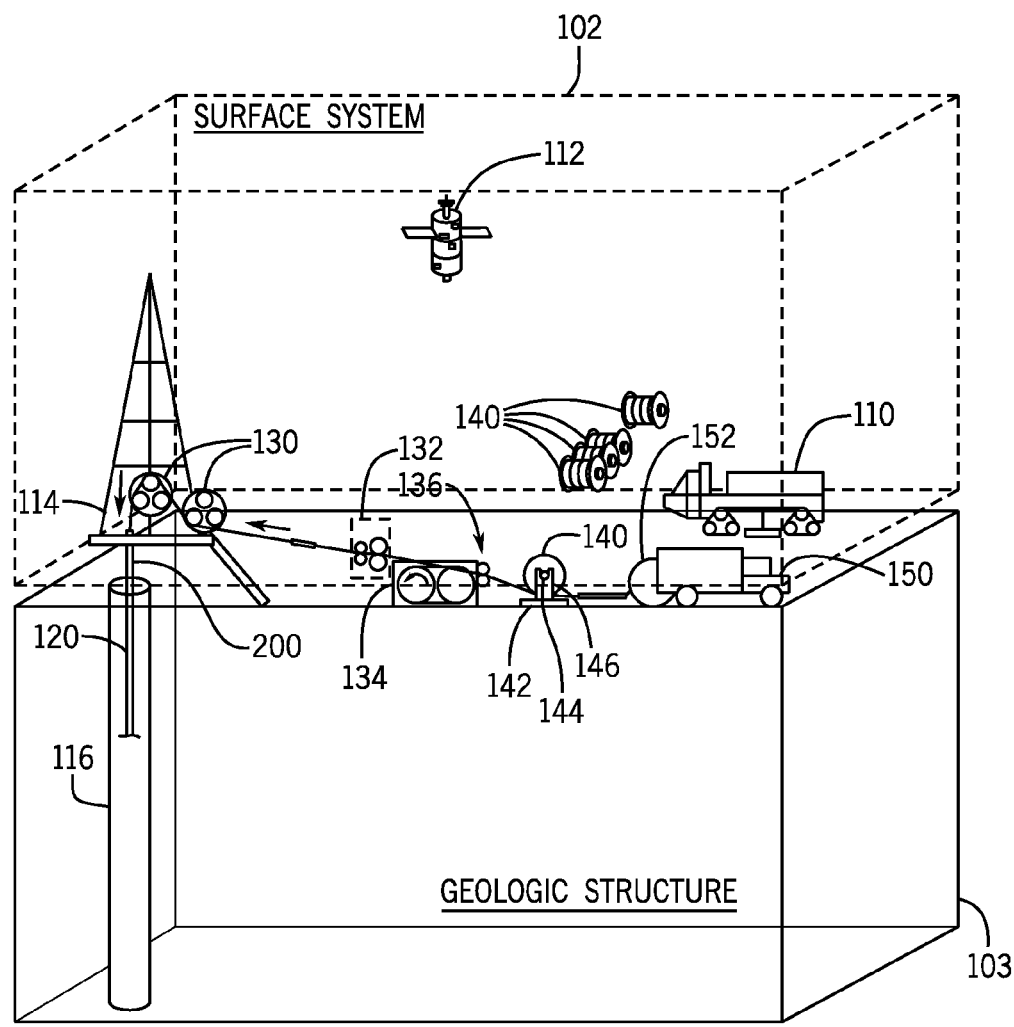
FIG. 1 is a schematic diagram of a seismic acquisition system according to an example implementation.

Systems and techniques are disclosed herein for purposes of deploying and using a cable-based seismic acquisition system (called a "scalable borehole acquisition system" herein) in a well. The scalable borehole seismic acquisition system may contain hundreds, if not thousands, of seismic receivers (or sensors), such as hydrophones and accelerometers. The deployed receivers may be advantageously used for seismic acquisitions, such as vertical seismic profile (VSP)-based acquisitions, that use active seismic sources, as well as passive seismic acquisitions, such as microseismic acquisitions that do not. As described herein, the scalable borehole acquisition system may have one or more of the following features that permit the use of a relatively large number of receivers, the customized scaling of the number of receivers for a given application, and the customized spatial distribution of the receivers for a given application:

connectable cable-based receiver cable sections; stackable cable-based receiver sections; microelectromechanical system (MEMS) receivers; a high speed telemetry network; and data concentrators to gather acquired data from the receivers for the high speed telemetry network.

The global increase in demand for energy resources and the increasing difficulty of expanding exploration into frontier areas leaves oil and gas exploration and production companies facing the ever-challenging task of extracting more hydrocarbons from existing reservoirs. The scalable borehole acquisition system that is disclosed herein may be used, as an example, to perform a VSP-based acquisition to address and maximize production productivity through the use of VSP-based acquisitions. VSP-based acquisitions provide insight into complex reservoirs, and may improve vertical resolution of acquired seismic data around a well. Moreover, a VSP-based acquisition may provide relatively high-resolution seismic images in the near regions surrounding the borehole.

In general, in a VSP-based acquisition, both the downgoing and the up-going seismic waves pass by borehole-disposed multicomponent receivers. The seismic waves may be attributable to energy produced by at least one surface seismic source, such as a vibrator in the case of a land-based acquisition, or an air gun, in the case of a marine acquisition. The borehole receivers are part of an array of multicomponent downhole receivers that are deployed in the borehole.

The data recorded by the array of receivers is communicated through a telemetry system to a "surface" of the well. In this context, the surface may be the Earth surface for a land-based well platform, a ship or in general, a region outside of the well. The data communicated to the surface may be further processed for purposes of imaging and other seismic processing applications that are generally directed to information about the surveyed geologic structure. The ability to record the downgoing wavefield at each receiver location in the borehole in a VSP-based acquisition is advantageous over conventional surface seismic recording techniques. In this manner, the information that is extracted from the downgoing waves may be used to enhance the final product of the upgoing wavefield VSP section. Because the scalable seismic borehole system that is disclosed herein allows the receivers to be relatively closely spaced through the area of interest in the borehole, a finely tuned image of the subsurface in the final VSP product may be obtained.

The scalable borehole acquisition system that is disclosed herein may also be used in a microseismic acquisition. As noted above, a microseismic acquisition does not use an active seismic source. For example, one type of microseismic data acquisition involves monitoring hydraulic fracturing (for such purposes as estimating a fracture network or fracture volume, as examples). In this manner, an array of receivers residing in a monitoring borehole records microseismic events or acoustic emissions that are attributable to the hydraulic fracturing in a treatment well. Data acquired by the array of receivers may be continuously communicated to a surface system through a telemetry system, and subsequent data processing may then determine microseismic event locations and their associated magnitudes.

Due to the relatively large number of receivers that may be deployed using the techniques and systems that are disclosed herein, the scalable borehole acquisition system may have a number of advantages. First, the scalable borehole seismic system may acquire a relatively denser spatial sampling for a given aperture (the length of the array of receivers). A relatively dense spatial sampling, in turn, enhances the cancellation of noise and generally improves the quality of the acquired data. Another advantage pertains to the decreased deployment and logistic costs. More specifically, when covering a certain depth with a relatively longer array, the number of "shots" per location tends decrease. Because each shot with a source (for example, a surface-based vibrator) at each location is repeated every time the receiver array moves, a long receiver array directly translates to a decreased deployment cost. Other and different advantages may be achieved, in accordance with further implementations.

As a more specific example, FIG. 1 depicts a surface system 102 that may be used to deploy and use a scalable borehole acquisition system 120 for purposes of acquiring information about a geologic structure 103. The scalable borehole acquisition system 120, in general, is used to deploy the scalable borehole acquisition system 120 in the well and retrieve the system 120 from the well at the end of the acquisition. The surface system 102 is further used to communicate commands and receiver data with the downhole scalable borehole system 120 and position the system 120 during the acquisition, as described herein. It is noted that although the systems and techniques that are disclosed herein are described in connection with a land-based well, the systems and techniques may likewise be applied to subsea wells, in accordance with further, example implementations. Moreover, the systems and techniques that are disclosed herein may be applied to deviated wellbores, in addition to the vertical wellbores that are illustrated in the figures.

Figures 2A, 2B:
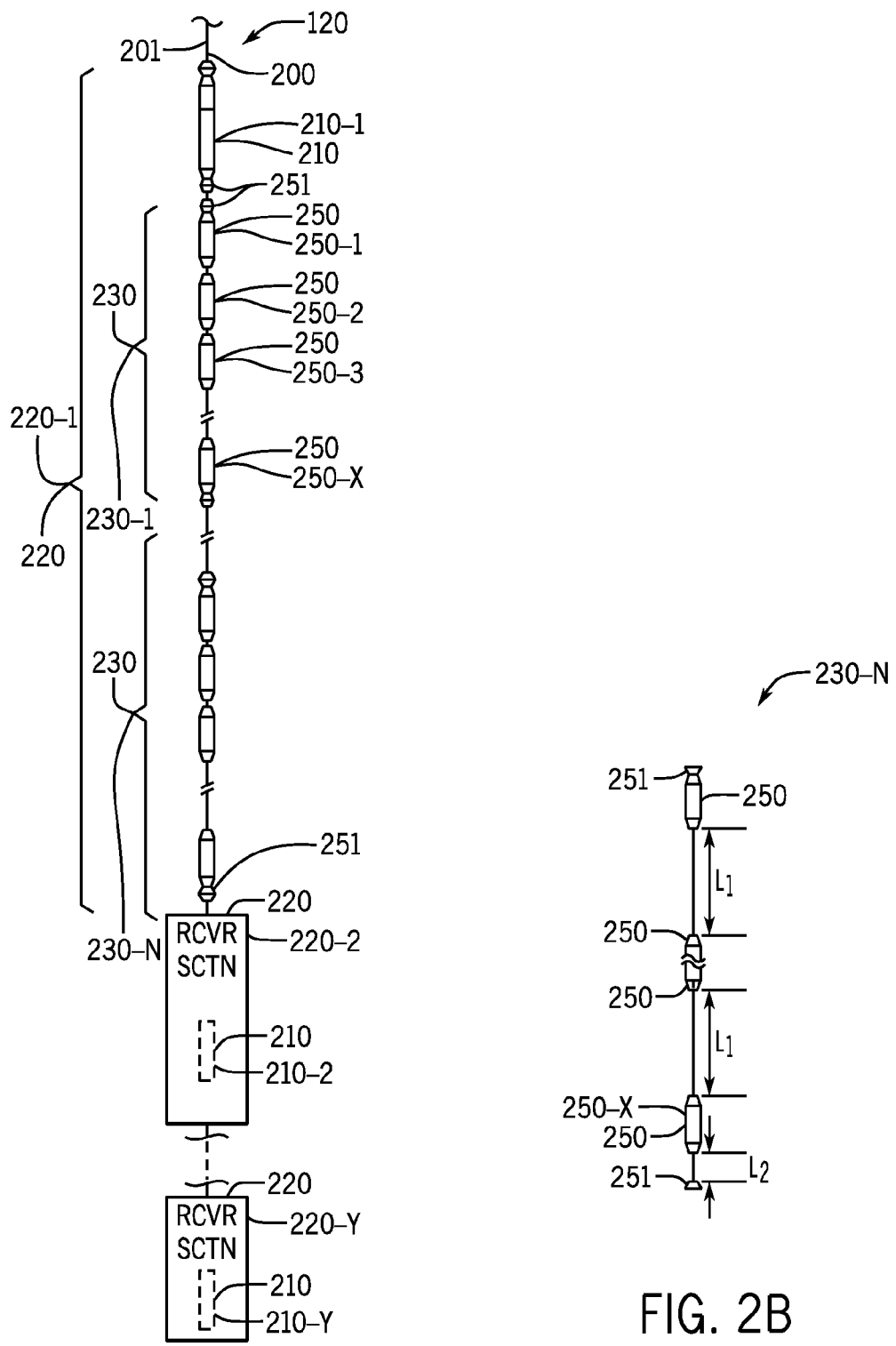
FIG. 2A is a schematic diagram of a scalable borehole acquisition system according to an example implementation.
FIG. 2B is a schematic diagram illustrating receiver-to-receiver spacing and receiver-to-concentrator spacing for the scalable borehole acquisition system according to an example implementation.

Referring to FIG. 2A in conjunction with FIG. 1, in accordance with example implementations, the scalable borehole acquisition system 120 is deployed on a cable 200 and includes downhole, "intermediate communication units" which are called "data concentrators," or "concentrators" herein. In FIG. 2A, the concentrators are assigned reference numeral "210." The scalable borehole acquisition system 120 for this example includes a Y number of concentrators 210 (concentrators 210-1, 210-2 and 210-Y, being specifically depicted in FIG. 2A). As described in more detail herein, the concentrators 210 gather receiver data from associated downhole receivers 250; distribute commands to the associated downhole receivers 250; and serve as nodes on a relatively high speed telemetry network (an optical fiber-based network, for example) that extends (via an upper part 201 of the cable 200) to the surface for purposes of communicating commands and acquired data with the surface system 102.

In accordance with example implementations, the scalable borehole seismic system 120 contains Y receiver sections 220 (example receiver sections 220-1, 220-2 and 220-Y, being depicted as examples in FIG. 2A), which are disposed on corresponding cable segments that are serially connected together in an end-to-end fashion, as depicted in FIG. 2A. In general, each receiver section 220 contains multiple seismic receivers 250 and an associated concentrator 210 at its upper end (for this example).

As further described herein, in accordance with example implementations, the receiver 250 may be a multicomponent receiver that contains multiple seismic sensing elements. For example, according to example implementations, the receiver 250 may sense three orthogonal components of particle motion as well as pressure.

The seismic receivers 250 of a given receiver section 220 do not communicate with the associated concentrator 210 using the high speed telemetry network; but rather, the receivers 250 and concentrator 210 of a given receiver section 220 are nodes of a relatively slower telemetry network. For example, the receivers 250 of a given receiver section 220 may communicate, for example, using twisted copper wire pairs, in accordance with example implementations. It is noted that the concentrator 210 is running at a relatively higher clock frequency, as compared to the clock frequency of the receiver 250, in accordance with example implementations, as the concentrator 210 is also a node of the high speed telemetry network.

In accordance with example implementations, the cable 200 has metallic conductor lines (copper lines) and one or more optical fibers. In this regard, the cable 200 is a "hybrid" cable and includes, along at least part of its length, communication paths (copper wires, for example) that are used by the lower speed telemetry network and one or more communication paths (optical fibers, for example) that are used by the high speed telemetry network. Moreover, as further disclosed herein, the cable 200 contains one or more additional metallic conductor lines (copper wires, for example) for purposes of delivering power downhole to the power consuming components of the scalable borehole acquisition system 120, such as the concentrators 210 and receivers 250.

In accordance with example implementations, each seismic receiver section 220 includes N seismic receiver subsections 230 (example subsections 230-1 and 230-N, being depicted as examples in FIG. 2A). In this manner, a given receiver subsection 230 may be coupled to other subsection(s) 230 via corresponding cable connectors. In accordance with example implementations, each receiver subsection 230 may be a pre-manufactured collection of an X number of seismic receivers 250 that are connected to each other end-to-end during fabrication. In accordance with example implementations, a given receiver subsection 230 has two connectors: one connector at its upper end and another connector at its lower end.

The receiver subsections 230 in the scalable borehole acquisition system 120 may provide one or more of the following benefits. The receiver subsections 230 may significantly reduce the labor costs and time associated with deploying the system 120 (having hundreds if not thousands of the receivers 250). In this manner, having the receiver subsections 230 makes it unnecessary to otherwise connect the receivers 250 one-by-one as the system is deployed into the wellbore 116. Moreover, the use of the receiver subsections 230 decreases the total cost of the system. In this manner, because the cable 200 of the scalable borehole seismic system 120 is a hybrid cable containing optical fiber(s) and metallic conductors, the use of the receiver subsections 230 eliminates the need for having expensive hybrid connectors for each single receiver, as a hybrid connector is used for a group of multiple receivers 250. Moreover, reducing the number of hybrid connectors may be advantageous because such connectors may be potential sources of malfunction; and as such, reducing the number of hybrid connectors may significantly increase the reliability of the system.

The cable 200 above the top concentrator 210-1 may have a relatively long length (a length of several kilometers, for example) for purposes of coupling the downhole array of seismic receivers 250 to the surface system 102. For this purpose, this upper cable segment 200 contains one or more optical fibers for the fiber optic backbone, as well as wires (copper wires, for example) for distributing power to the power consuming components of the system 120. Unlike the portion of the scalable borehole acquisition system 120 below it, the upper cable 201 does not contain copper wires (twisted pairs, for example) for purposes of communicating data, in accordance with example implementations.

In accordance with example implementations, the top concentrator 210-1 may include additional features that are not part of the other concentrators 210. In this regard, in accordance with some implementations, the top concentrator 210-1 may include such features as a Gamma ray detector and power supply/conversion circuitry for distributing power received from the surface to the remainder of the system 120 below the top concentrator 210-1. Moreover, the top concentrator 210-1 may include a logging head. In this manner, the logging head may include such sensors as force and temperature sensors, which allow measurement of the tension of the cable 200 and the temperature of the mud. The top concentrator 210-1 may further include a telemetry cartridge that exchanges data and commands with the surface system 102, in accordance with example implementations.

Referring to FIG. 2B in conjunction with FIG. 2A, in accordance with example implementations, the receivers 250 are generally spaced apart by a length (called "$L_1$" in FIG. 2A). For purposes of evenly distributing the receivers 250, a distance (called "$L_2$" in FIG. 2B) between the receivers 250-X and its connector 251 for connecting the receiver 250-X to the next concentrator 210 is different: $L_2$=D−ConcentratorLength)/2. Likewise a mating connector 251 to the concentrator 210 has the same $L_2$ spacing. This way, two seismic receivers 250 with a concentrator 210 in between still have a distance equal to $L_1$. If the length of the connectors is not negligible, this length is also taken into consideration to provide an array of evenly distributed seismic receivers 250.

It is noted that the a given receiver subsection 230 has a concentrator 210 and several receivers 250; and the lowest receiver 250 is connected to the concentrator 210 below it. After that, a predefined number of receiver subsections 230 are connected to each other, one after the other. When the last receiver subsection 230 in the top of the section 220 is connected, in the deployment of the scalable borehole acquisition system 120 into the well, the cable segment 201 with corresponding connectors 251 is used to make the final connection to the top concentrator 210-1.

In accordance with example implementations, the scalable borehole acquisition system 120 may allow a "flexible" array configuration to be customized to the specific application. For example, for some applications, geophysicists may desire a collection of receivers 250 (i.e. "sections" 230 of receivers) at one given depth and then a relatively long distance "gap" in between without any receivers 250, and another group of receiver sections 230, etc. The array customization is feasible due to the relatively high data rates with the concentrators 210 through the fiber optic backbone.

Referring to FIGS. 3A and 3B, in accordance with example implementations, an example section 300 of the system 120 illustrating this spacing includes receiver sections 230 and an intentionally-designed gap 310 between certain receiver sections 230. Thus, as depicted in FIG. 3B, a particular section of the system may include the corresponding gap 310 between adjacent concentrators 210.

Figure 4:
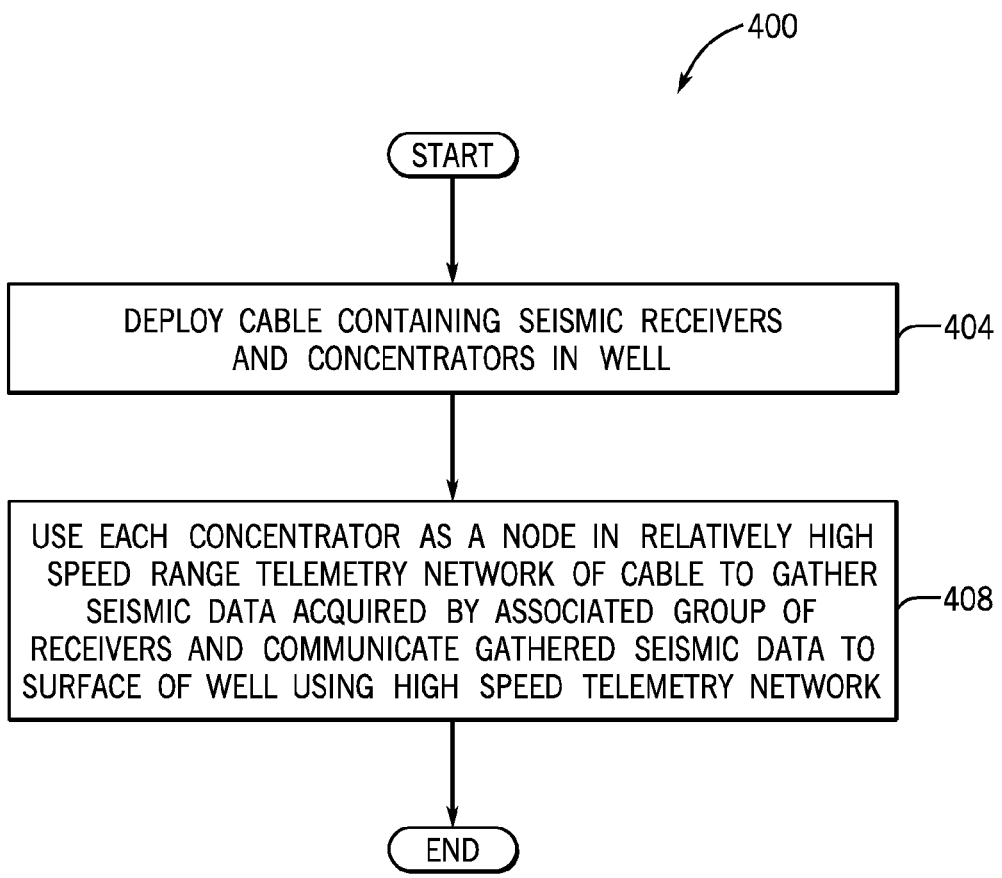
FIG. 4 is a flow diagram depicting a technique to deploy and use a scalable borehole acquisition system according to an example implementation.

Referring to FIG. 4, to summarize, in accordance with example implementations, a technique 400 includes deploying (block 404) a cable containing seismic receivers and concentrators in a well. Pursuant to the technique 400, each concentrator is used (block 408) as a node in a relatively high speed telemetry network to gather seismic data acquired by an associated group of receivers and communicate the gathered seismic data to the surface of the well using high speed telemetry network.

Figure 5:
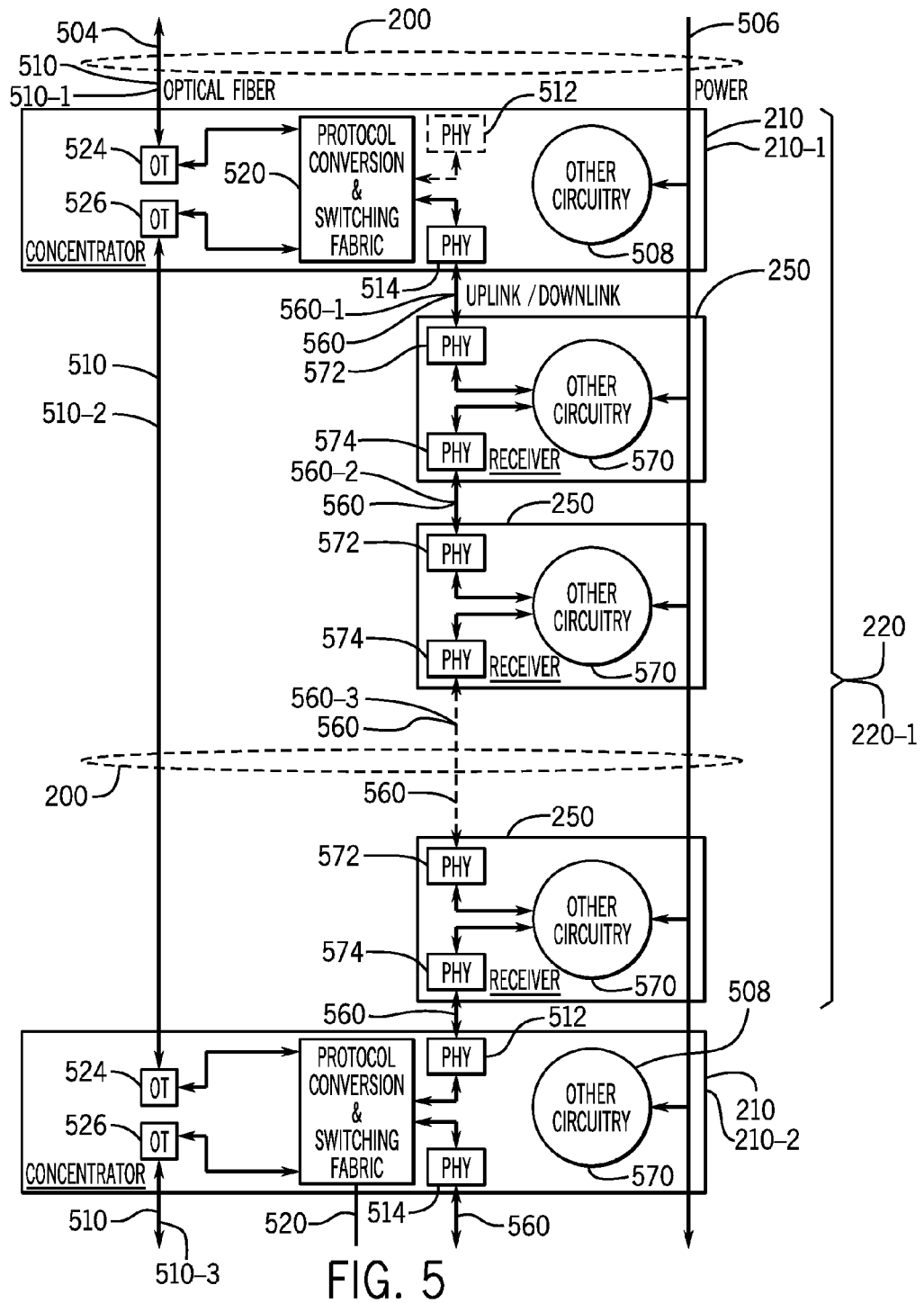
FIGS. 5 and 6A are schematic diagrams illustrating seismic receiver and concentrator circuitry for an example receiver section of the scalable borehole acquisition system according to example implementations.

Referring to FIG. 5, in accordance with example implementations, the seismic receivers 250 for a given section 220 (such as example section 220-1, which is depicted in FIG. 5) communicate using a relatively lower speed, copper-based communication protocol. A lower speed copper based communication protocol is used for communication with the receivers 250 on each receiver section 220. In this manner, in accordance with example implementations, twisted copper wire pairs 560 (example twisted pairs 560-1, 560-2 and 560-3, being shown in FIG. 5) of a given receiver section connect to physical network interfaces 572 and 574 of the various seismic receivers 250 for purposes of implementing layer one of the Open Systems Interconnection (OSI) model layers in a point-to-point fashion.

Each physical interface 572, 574 includes two "links": an "uplink" for delivering the measurement and status data to the surface system 102 (see FIG. 1); and a "downlink" for delivering command and synchronization data from the surface system 102 to the receivers 250. It is noted that in accordance with other example implementations, the seismic receivers 250 may be connected in a point-to-point fashion using wiring other than twisted copper pairs. Moreover, although specific low speed telemetry protocols are described herein, any of a number of protocols may be used, depending on the particular implementation, as can be appreciated by one of ordinary skill in the art.

Thus, as shown in FIG. 5, in general, each seismic receiver 250 includes two physical interfaces 572 and 574, as well as "other" circuitry 570, further described herein. Moreover, as depicted in FIG. 5, for purposes of communicating over the lower speed telemetry network used by the seismic receivers 250, the concentrator 210 includes physical interfaces 512 and 514. It is noted that each concentrator 210 includes two physical interfaces for communicating with receivers 250, thereby allowing a given concentrator 210 to either gather data from a group of seismic receivers 250 disposed uphole of the concentrator 210, or, alternatively, a group of seismic receivers 250 disposed downhole of the concentrator 210. This arrangement allows seismic data to be accumulated, or gathered, from either the group of seismic receivers 250 uphole or downhole to a given concentrator 210, which may be advantageous in the event of equipment failure (failure of a particular concentrator 210, for example).

Contrary to the communication used between the concentrator 210 and its associated group of receivers 250, the concentrators 210 (example concentrators 210-1 and 210-2 being depicted in FIG. 5) communicate with each other and with the surface using a relatively high speed communication protocol. For the example of FIG. 5, concentrators 210-1 and 210-2 communicate over an optical fiber-based network. In this regard, each concentrator 210 contains optical transceivers (OTs) 524 and 526 that are coupled to corresponding fiber optic segments 510 (example segments 510-1, 510-2 and 510-3 being depicted in FIG. 5) of the cable 200 for purposes of either communicating data uphole or downhole. This forms the "fiber optic backbone" and exchanges the accumulated data from the sections between concentrators. It also includes and uplink and a downlink. It is noted that the optical fibers only "pass through" the seismic receivers 250 and, in accordance with example implementations, do not have any interaction with the circuitry included therein.

As depicted in FIG. 5, in general, the concentrator 210 therefore includes optical transceivers 524 and 526 for the high speed telemetry network; physical interfaces 512 and 524 for the low speed telemetry network; and protocol conversion and switching fabric 520 for forming a communication bridge between the low speed and high speed telemetry networks.

Figure 6A:
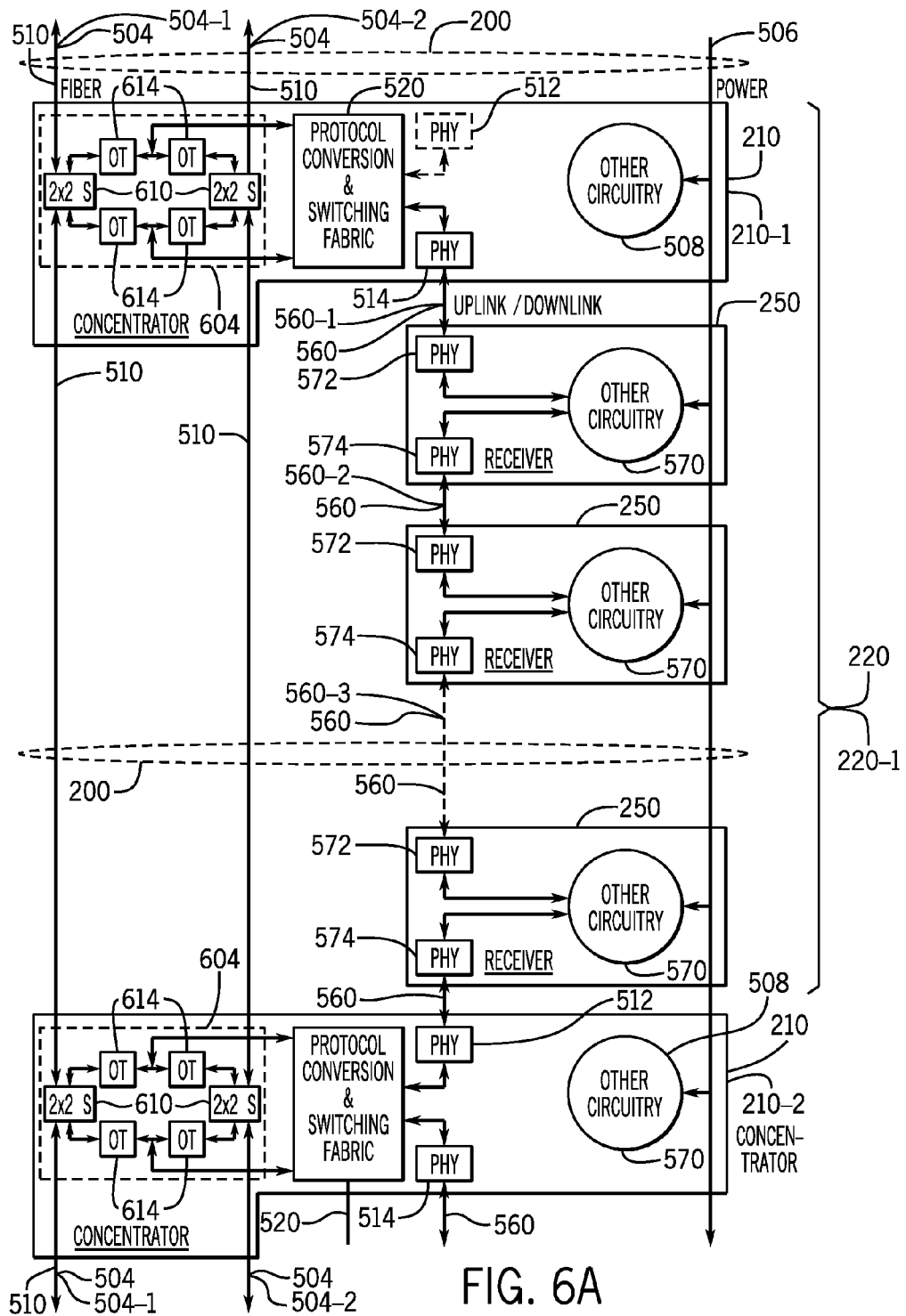

Referring to FIG. 6A, the cable 200 may contain multiple optical fibers 504 (two optical fibers 504-1 and 504-2, being depicted in FIG. 6A) in accordance with further example implementations. The multiple optical fibers may be advantageous for purposes of adding redundancy. In this manner, as shown in FIG. 6A, in accordance with example implementations, the concentrator 210 contains a high speed telemetry network interface 604 that includes optical 2×2 switches 610 and four optical transceivers 614. The 2×2 optical switches 610 have two modes that are controlled by signals to either place the interface 604 in a bypass mode in which the concentrator 210 is not coupled to the high speed telemetry network; or a connected mode in which the concentrator 210 is coupled to the high speed telemetry network for purposes of communicating data.

In general, a given concentrator 210 may be placed in the bypass mode to remove a "bad" unit from the fiber optic backbone. In the connected mode, the optical switches 610 couple the optical transceiver 614 to the optical fibers 504.

The control signals of the optical switches 610, in accordance with example implementations, are coupled to pull up and/or pull down resistors (not shown) in addition to any other signals provided by the concentrator 210, for purposes of maintaining the switches 610 in respective decoupled states to, by default, place the interface 604 in the default mode. In this manner, in accordance with example implementations, when the concentrator 210 is powered up in the default mode, the concentrator 210 performs one or more tests for purposes of determining whether the concentrator 210 is to be coupled to the fiber optic backbone and thereby transition to the connected mode.

Figure 6B:
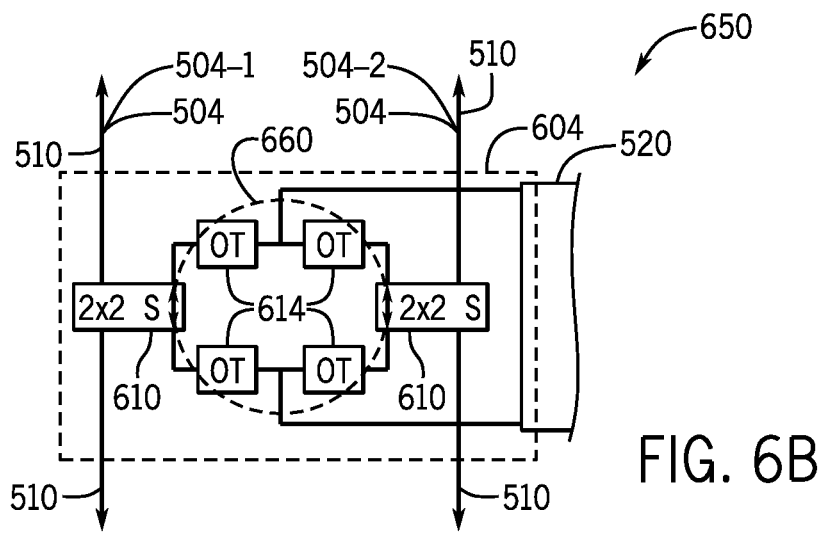
FIG. 6B is a schematic diagram illustrating a loopback test used by the concentrator of FIG. 6A according to an example implementation.
Figure 6C:
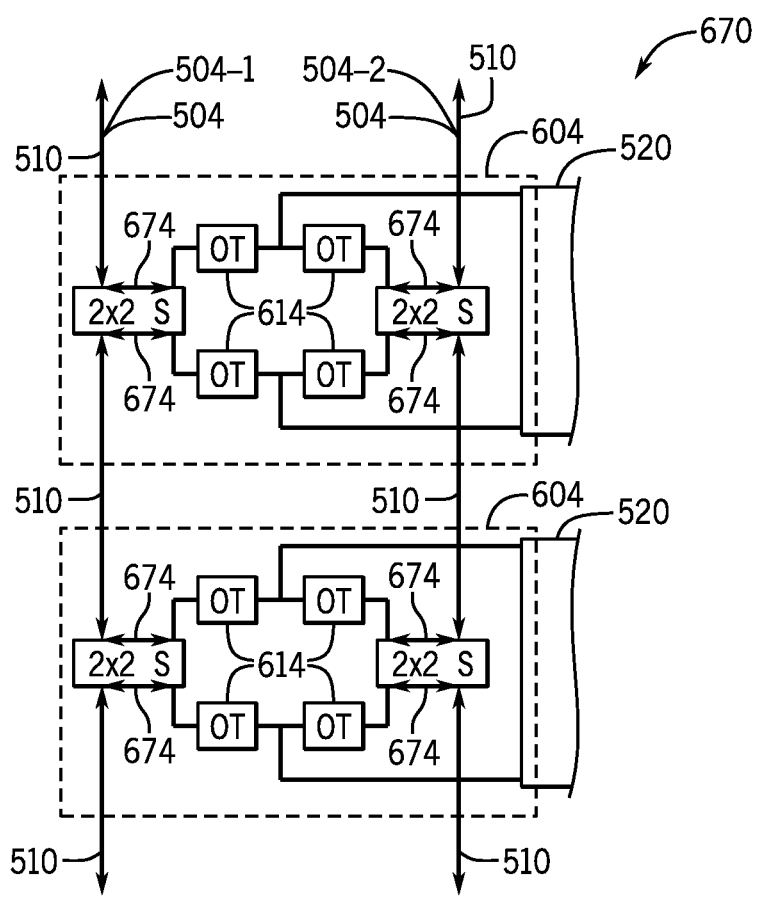
FIG. 6C is a schematic diagram illustrating redundant optical switch operation of the concentrator of FIG. 6A according to an example implementation.

As a more specific example, in accordance with example implementations, when the concentrator 210 is powered up, the concentrator 210 performs a loopback test on the optical transceivers 614 to test the functionality of the transceivers 614. A loopback test 650 is generally depicted in FIG. 6B. In this test, the concentrator 210 generates "dummy" data and measures the quality of it within the loop. After performing the loopback test, the concentrator 210 determines whether to transition the concentrator 210 from the bypass mode to the connected mode. In this manner, if a determination is made to couple the concentrator 210 to the fiber optic backbone, the concentrator 210 transitions the optical switches 610 to couple the optical transceivers 614 to the optical fibers 504, as depicted in FIG. 6C. Thus, using the loopback test, the concentrator 210 may discover one or more "bad" optical transceivers 614, which keeps the concentrator 210 in its default bypass mode to prevent defective equipment from being coupled to the high speed telemetry network.

The bias of the concentrator 210 to be disconnected from the high speed telemetry network also aids in disconnecting a concentrator 210 that malfunctions after power up. In this manner, if a concentrator 210 begins malfunctioning, the control signals to the optical switches 614 "disappear" (i.e., are deactivated), and the pull-up and pull-down resistors cause the switches 610 to decouple from the high speed telemetry network, thereby transitioning the concentrator 210 back into the bypass mode.

The above-described redundancy and ability of the concentrators 210 to decouple from the high speed telemetry network by default permits the scalable borehole acquisition system 120 to continue its data acquisition in the event of equipment failure, eliminating, for example, the need to retrieve the entire system 120 and repair a bad concentrator 210, thereby saving rig and logistics time, and the costs associated therewith.

Referring back to FIG. 6A, in accordance with example implementations, a given concentrator 210 uses both optical fibers 504-1 and 504-2 in its transmission. In other words, in accordance with some example implementations, the optical transceivers 614 transmit the same data simultaneously in a redundant fashion to both optical fibers 504-1 and 504-2. However, for purposes of receiving data, the interface 604 monitors the quality of data on both optical fibers 504-1 and 504-2. In this manner, the data extracted from both fibers is monitored continuously and based on the quality of each link (a bit error rate, for example), the interface 604 selects the "best" optical fiber 504-1 or 504-2 and extracts the data from the selected fiber. In accordance with example implementations, this is a dynamic process, as a given concentrator 210 may change extracting data between the two fibers 504-1 and 504-2 during the data acquisition.

In accordance with example implementations, if one optical fiber is used, the optical transceiver 614 may be a wavelength division multiplexing (WDM) optical transceiver so that uplink data and commands may be communicated over the same optical fiber. Moreover, in accordance for example implementations in which two optical fibers are used in a redundant fashion, the optical transceivers 614 may be WMD optical transceivers.

Figure 7A:
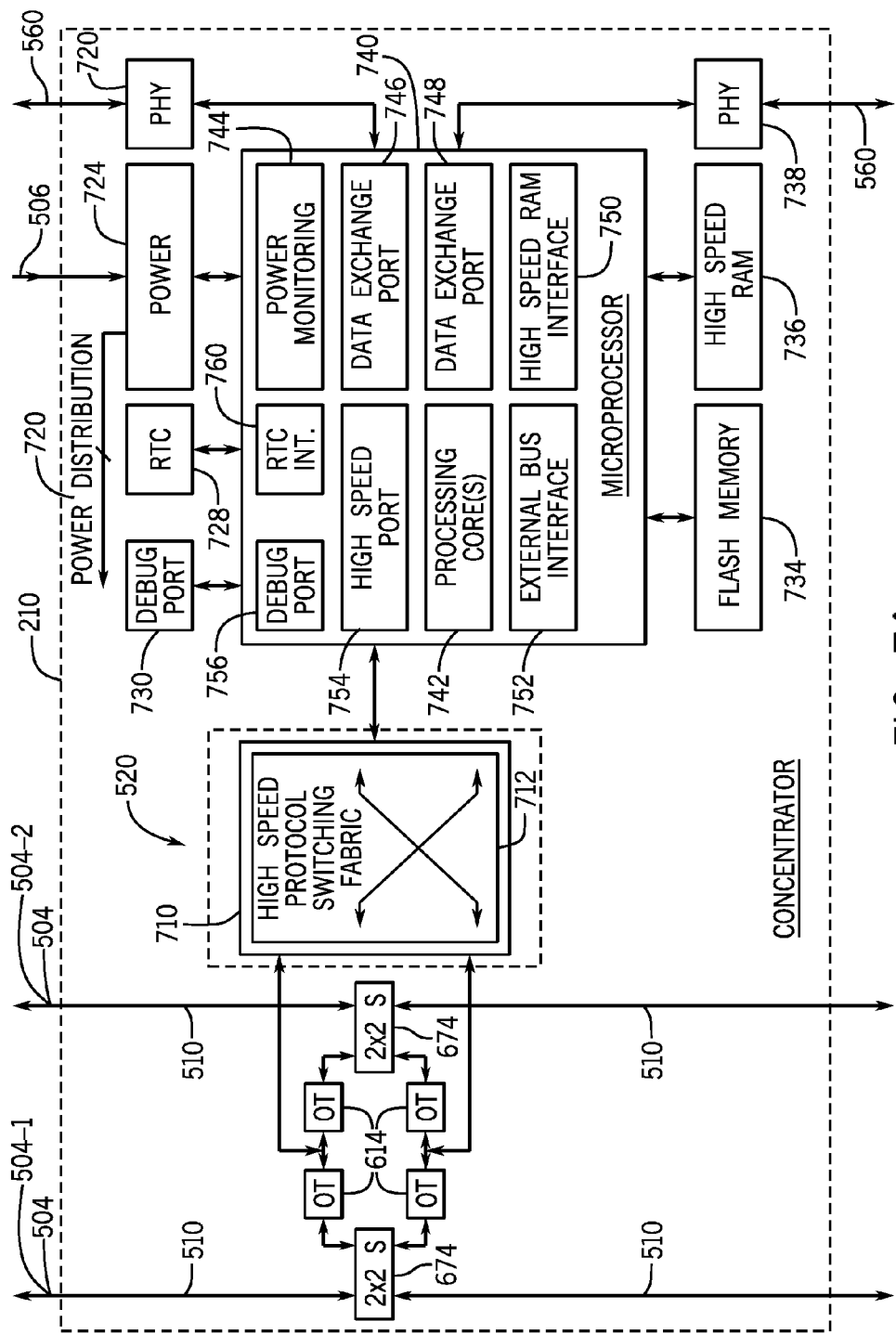
FIGS. 7A, 7B, 7C and 7D are schematic diagrams of concentrators according to example implementations.

Referring to FIG. 7A, in accordance with example implementations, the concentrator 210 may be constructed from commercially available off-the-shelf components. For example, the concentrator 210 may include a component 710 that provides a switching fabric 712 that uses a high speed protocol and at least one microprocessor 740. The microprocessor 740, among its various functions, receives data on its data exchange ports 746 and 748 from downhole 738 and uphole 720 copper telemetry physical interfaces, repackages the data into the format of the high speed data protocol (layer 2 and/or layer 3 of the OSI model) and forwards the reformatted data through a high speed port 754 to switching fabric 710. In accordance with example implementations, the microprocessor 740 may also run higher layers of the OSI model, as well as applications related to borehole seismic and microseismic data acquisition.

The switching fabric 710 runs at the speed of the high speed data communication protocol (running on the fiber optic backbone) and routes the data based on the addresses assigned to the data, via the optical transceivers 614 using the physical layer (layer 1 of the OSI model) of the implemented high speed protocol. In order to accomplish this, the microprocessor 740, in accordance with example implementations, has one or multiple processing cores 742 that executes program instructions at relatively very high speeds. For this purpose, the microprocessor 740 may access instructions and other data stored in a high speed random access memory (RAM) 736, which is coupled to a high speed RAM interface 750 of the microprocessor 740.

In accordance with example implementations, the concentrator 210 further includes a flash memory 734 that is coupled to an external bus interface 752 of the microprocessor 740. In accordance with example implementations, the flash memory 734 stores the "boot strap" and application software instructions that are executed by the processing core(s) 742. Among its other features, in accordance with example implementations, the microprocessor 740 includes a debugging port 756 for testing and debugging purposes.

In accordance with example implementations, the concentrator 210 further includes power regulation circuitry 724 that receives power from one or multiple lines 506 (copper lines, for example) of the cable 200 and generates and distributes (via distribution lines 720) various regulated voltages to different power consuming components of the system. The power unit 724 also, in accordance with example implementations, monitors the status of the power that enters the concentrator 210 and the power that has been distributed to the components via the lines 720.

In seismic and microseismic measurements, the measurement data is timestamped with a time that is synchronized with the global positioning satellite (GPS) time (acquired from a satellite, as depicted by reference numeral 112 of FIG. 1). An RTC unit 728 of the concentrator 210 contains circuitry (a phase locked loop containing a voltage controlled oscillator (VCO), for example), which is regularly adjusted so that the RTC is synchronized with the GPS clock. The GPS clock is communicated through the high speed telemetry network from the surface system. The RTC unit 728 may maintain synchronization through various protocols, depending on the particular implementation.

Figure 7B:
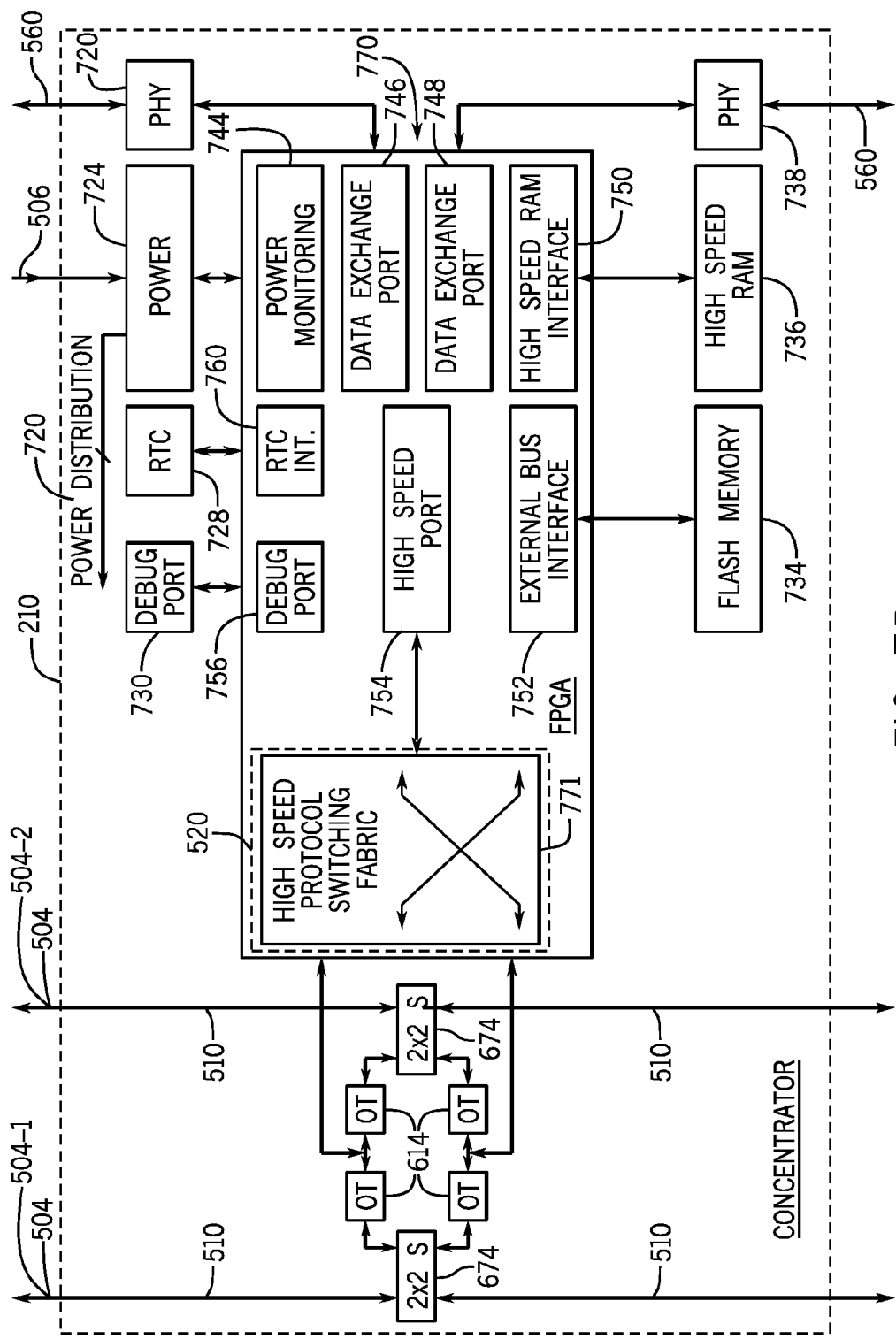
Figure 7C:
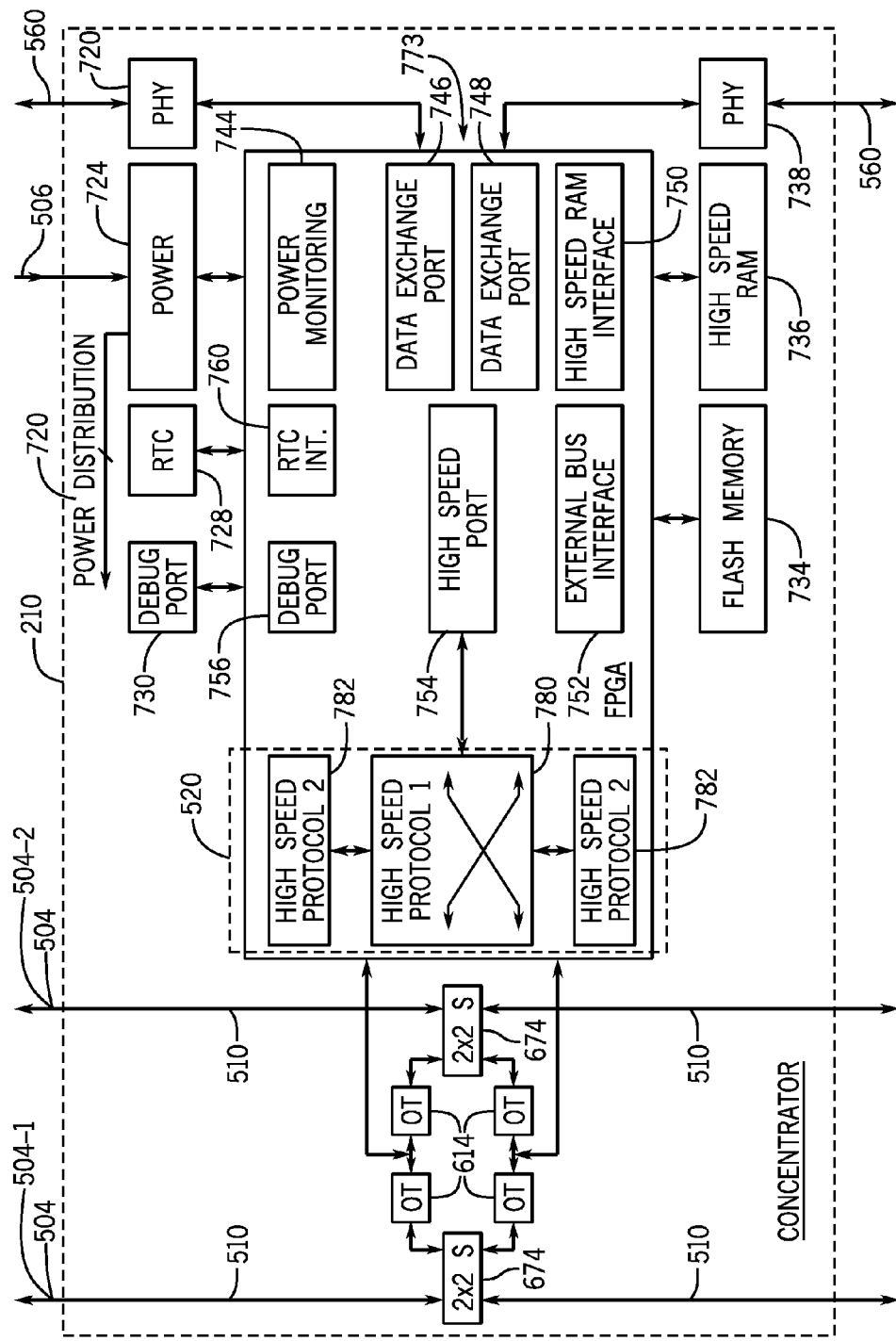

FIG. 7B depicts a further example implementation in which the microprocessor 740 and the component 710 are replaced by a field programmable gate array (FPGA) 770 which integrates these two components together, as the switching fabric 771 is integrated into the FPGA 770. FIG. 7C depicts a further example implementation similar to the implementation of FIG. 7B, but where an FPGA 773 replaced the FPGA 770 of FIG. 7B. The FPGA 773 has a similar design to the FPGA of FIG. 7B, but the switching fabric 771 of FIG. 7B is replaced with fabric 711 that is constructed to allow one high speed protocol 782 to run over another high speed protocol 780.

Figure 8A:
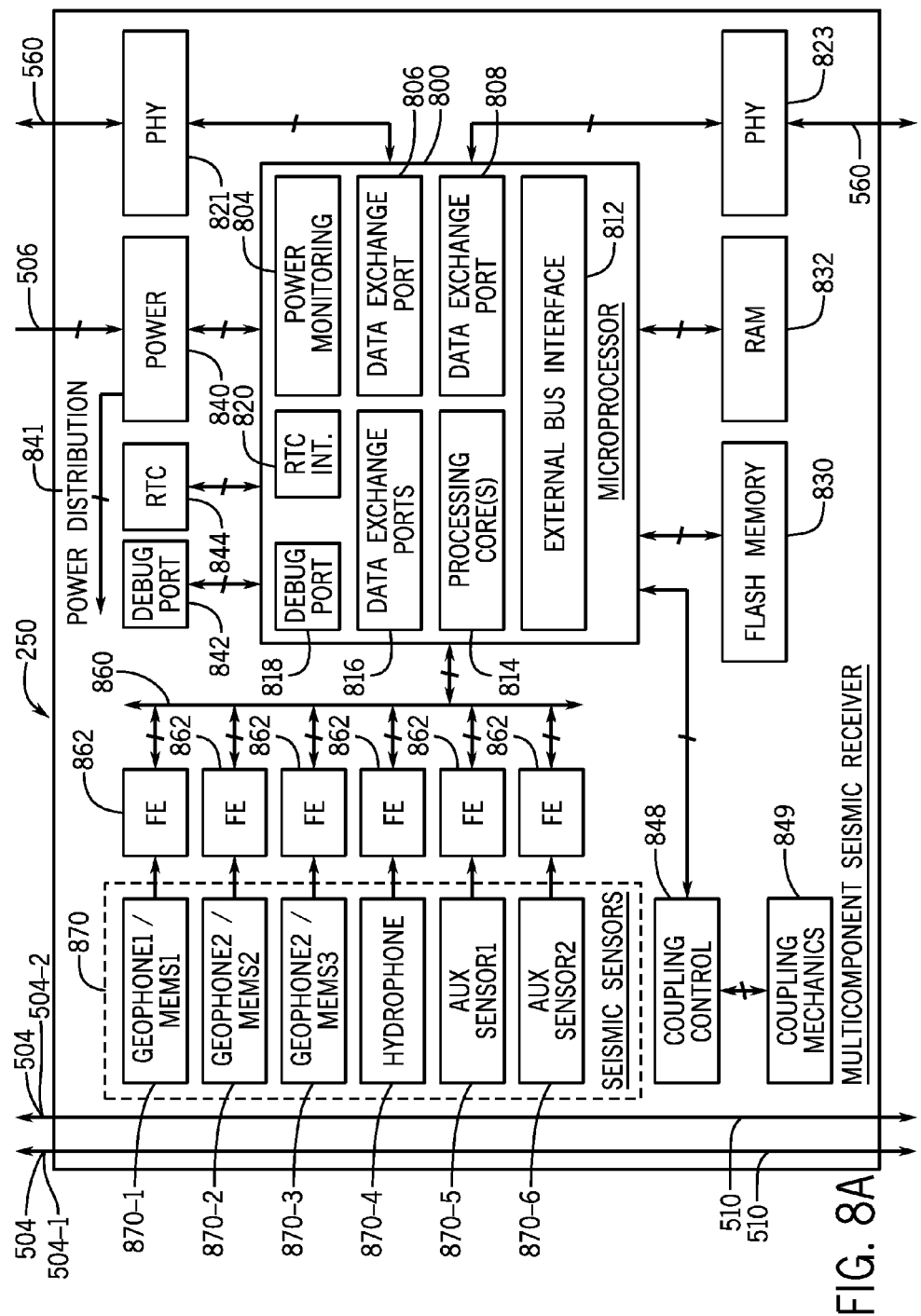
FIGS. 8A, 8C and 8D are schematic diagrams of multi-component seismic receivers according to example implementations.

Referring to FIG. 8A, in accordance with some implementations, the seismic receiver 250 is a multicomponent receiver and is constructed from commercially available off-the-shelf components. For this implementation, the receiver 250 includes a microprocessor 800, which has one or more processing cores 814 and data exchange ports 806 and 808 for communicating data with copper telemetry physical interfaces 821 and 823, respectively. The microprocessor 800 also includes one or more data exchange ports 816 for purposes of coupling (via a bus 860) with front end interfaces 862 of various seismic sensors 870 of the receiver 250.

In general, the microprocessor 800 runs the low speed data protocol stack (layer 2 and/or layer 3 of the OSI model); and in accordance with some implementations, the microprocessor 800 may run higher layers of the OSI model as well as applications related to borehole seismic and microseismic data acquisition. As depicted in FIG. 8A, the receiver 250 includes a RAM 832, which shadows the instructions executed by the processing core(s) 814. A flash memory 830 of the receiver 250 may store the boot strap and application software for execution by the processing core(s) 814. The microprocessor 800 may contain various other components, such as a debugging port interface, an RTC interface 820, a power monitoring interface 804, an external bus 812, and so forth.

Similar to the concentrator 210, the receiver 250 may contain at least one debugging port 842, an RTC unit 844 and a power unit 840, which perform functions similar to the corresponding units of the concentrator 210.

As depicted in FIG. 8A, in accordance with example implementations, the seismic sensors 870 may include three geophones 870-1, 870-2 and 870-3, which are aligned along orthogonal sensitive axes (x, y and z axes, for example) and a hydrophone 870-4. Moreover, the seismic sensors 870 may include auxiliary sensors such as the illustrated sensors 870-5 and 870-6 (temperature sensors, pressure sensors, and so forth). Front end interfaces 862 are responsible for the reception of the seismic waves in the form of analog signals from the sensors 870, amplifying them and digitizing them. The front end interfaces 862 may include signal conditioning units, filters and other circuitry, as can be appreciated by one of ordinary skill in the art. In accordance with some implementations, the front end interfaces 862 may receive control data from the microprocessor 800 via the bus 860 as well as communicate the acquired digitized sensor data to the microprocessor 800. As an example, in accordance with some implementations, the front end interfaces 862 may receive control data to calibrate a given sensor or change different operating variables by accessing registers residing inside the interface 862.

FIG. 8A also depicts coupling control 848 and coupling mechanics 849. In general, the seismic sensors 870 are coupled to the formation where the sensors 870 are physically located. The coupling mechanics 849 may include an arm-based coupling system (for open hole applications) or a magnetic-based coupling system (for cased hole applications). The coupling control 848 represents motion control and mechanical elements, as well as control circuitry, that may be controlled by the microprocessor 800 for purposes of controlling the coupling mechanics 849. As depicted in FIG. 8A, the optical fibers 504-1 and 504-2 pass through the receiver 250 without interacting with any elements of the receiver 250, in accordance with example implementations.

Figure 8B:
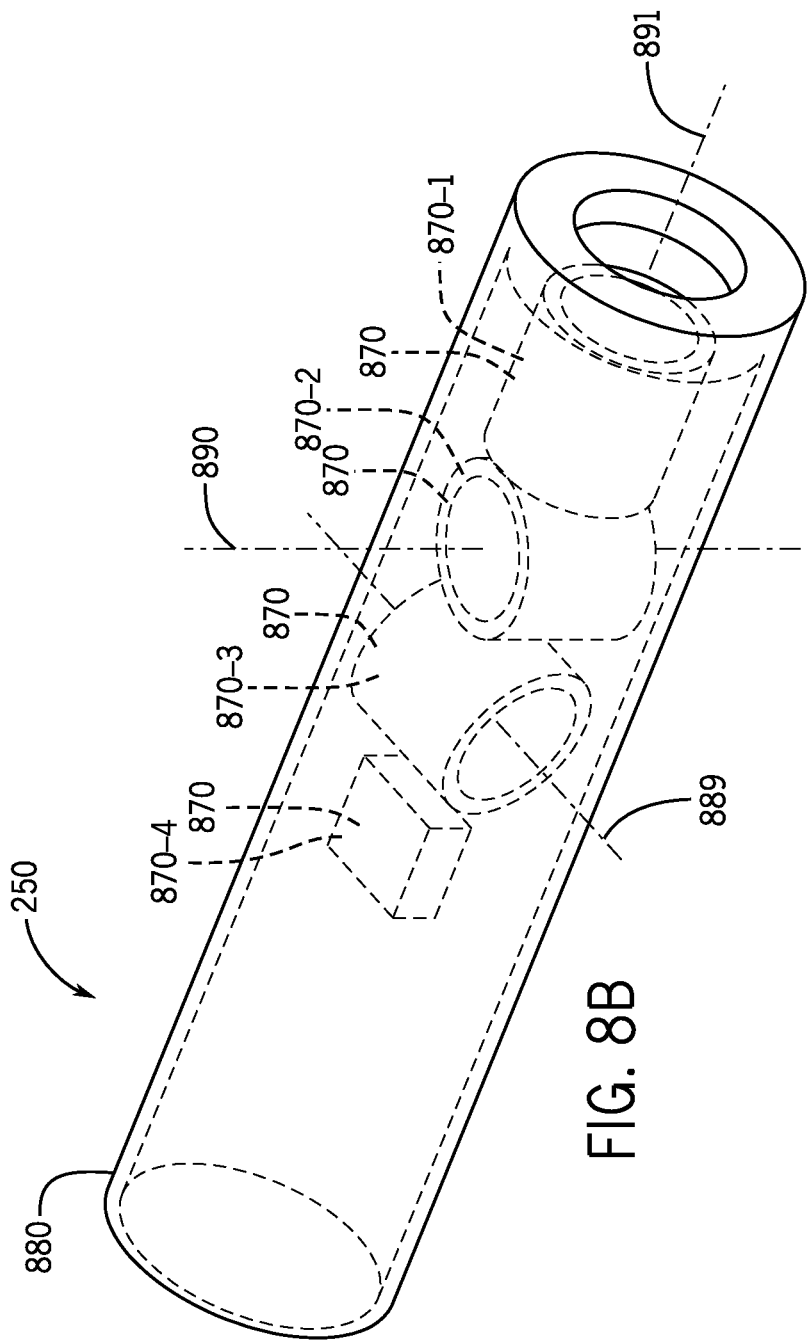
FIG. 8B is a perspective view of a multicomponent seismic receiver according to an example implementation.

Referring to FIG. 8B, in accordance with some implementations, the seismic sensors 870 may be disposed in a sensor package, such as in the depicted cylindrical housing 880 that is constructed to be connected inline with the cable 200. Generally, the hydrophone 870-4 may be constructed to record wider band (higher frequency side) signals, which may not be possible with the geophones 870-1, 870-2 and 870-3 due to the limitation of the sensor coupling. There may be other uses of the hydrophone 870-4 such as supplementary measurements for the geophone measurement (such as for purposes of noise reduction). For microseismic applications, the hydrophone data may be useful for corner frequency determination for the events identified and located by the geophone data. As shown in FIG. 8B, the geophones 870-1, 870-2 and 870-3 are oriented along corresponding sensitive axes 891, 890 and 889, respectively.

Figure 9:
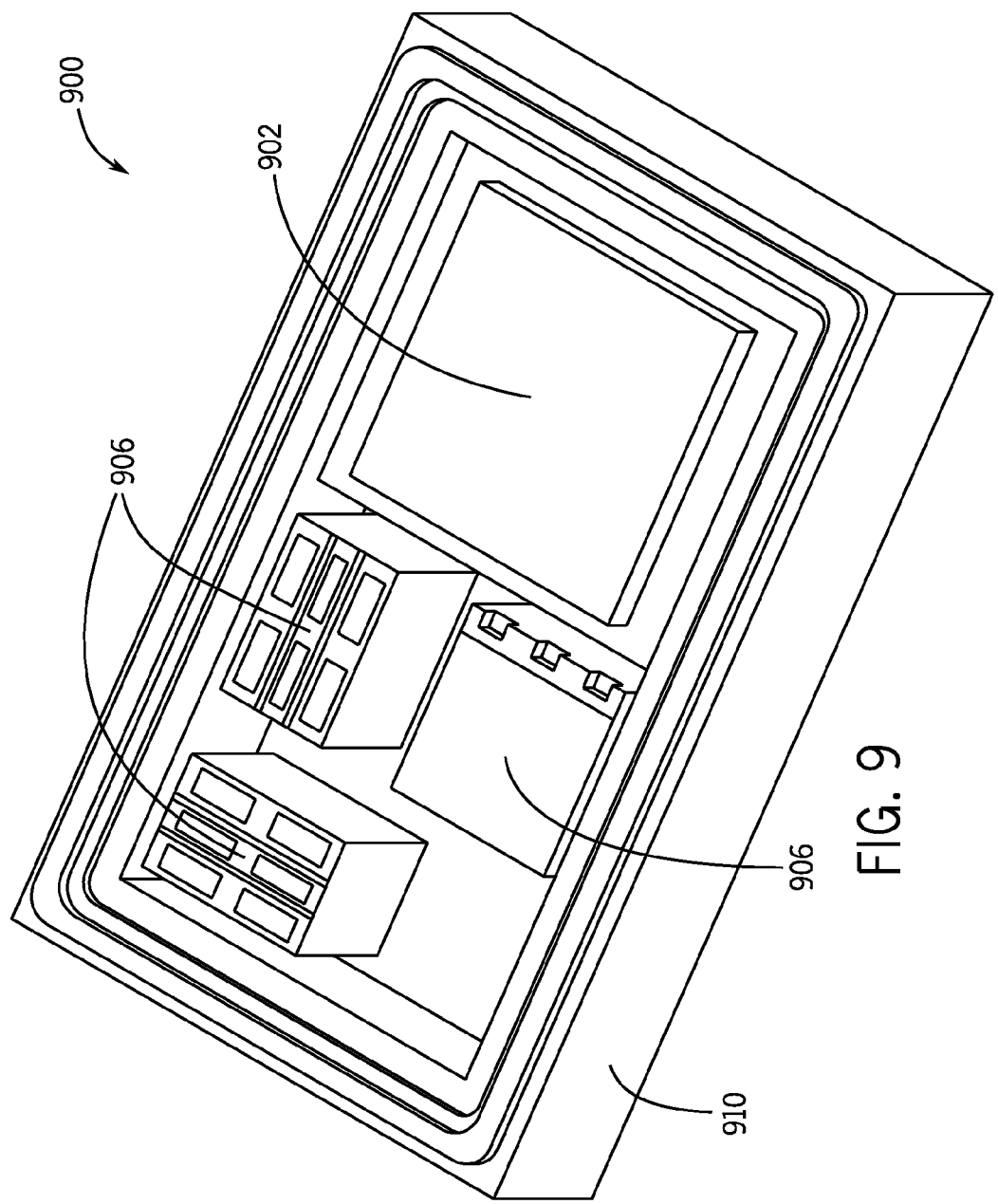
FIG. 9 is a perspective view of a microelectromechanical system (MEMS)-based multicomponent seismic receiver according to an example implementation.

Referring to FIG. 9, in accordance with example implementations, the geophones may be microelectromechanical system (MEMS)-based sensors that are arranged in a relatively compact assembly 900. For this example, the assembly 900 includes three MEMs accelerometers 906 that are disposed in a compact, hermetically sealed package 910 along different orthogonal sensitive axes. It is noted that FIG. 9 depicts a space-friendly implementation in which the three orthogonal MEMs accelerometers 906 are implemented together with corresponding front end circuitry 902 within a single application specific integrated circuit (ASIC). The assembly 900 reduces the size and weight of the seismic sensors drastically, in accordance with example implementations and enhances the deployment of system containing a large number of receivers.

In accordance with example implementations, the lower speed copper-based communication protocol used on the lower speed telemetry network (the twisted copper wire network, for example) is Fast Ethernet; and the two protocols that are used on the high speed telemetry network are as follows: a synchronous digital hierarchy (SDH) protocol and a Gigabit Ethernet protocol. The Gigabit Ethernet protocol "runs" over the SDH protocol.

Figure 7D:
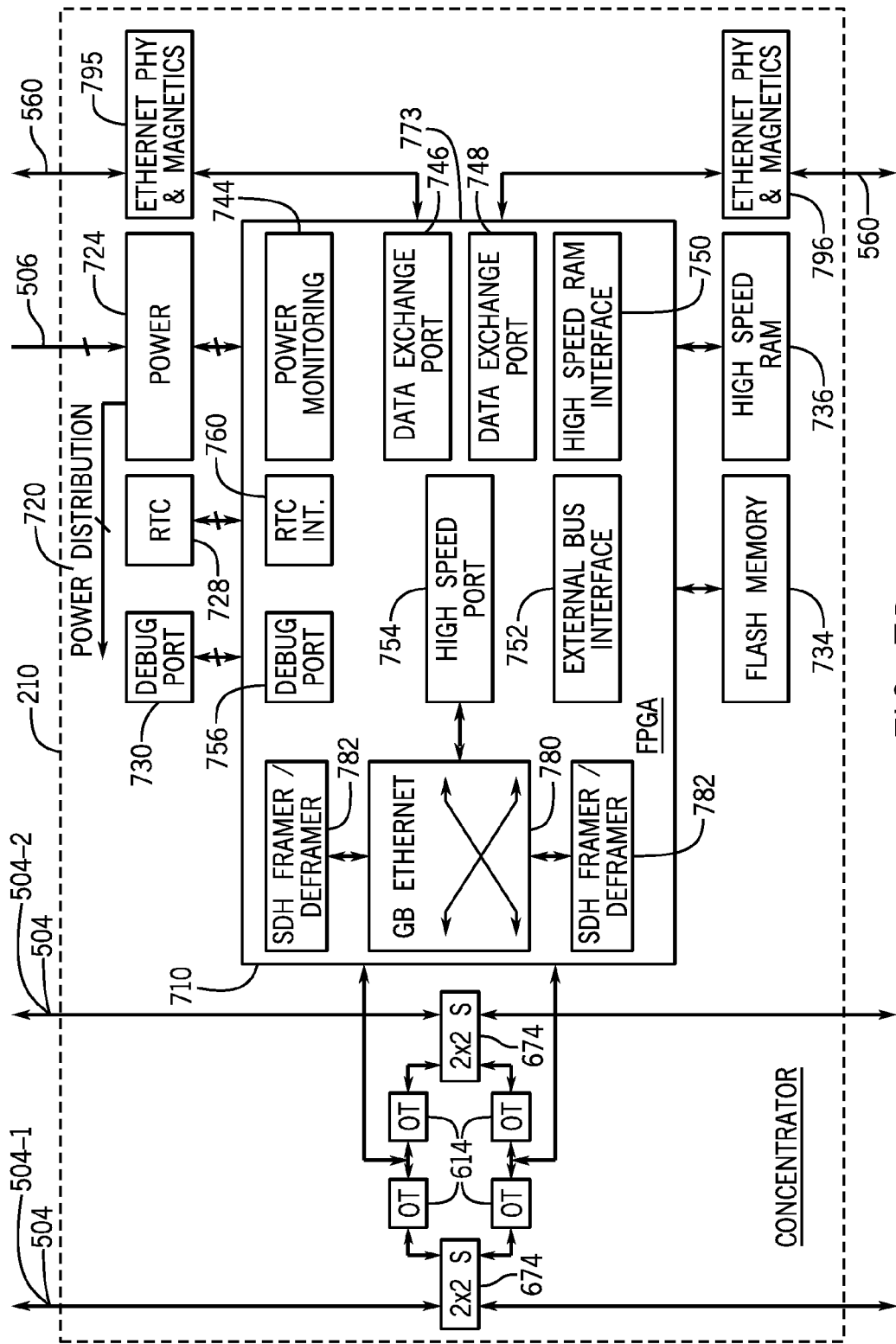

As a more specific example, FIG. 7D depicts a concentrator 210 that has, in general, a similar design to the concentrator 210 of FIG. 7C, with similar reference numerals being used. The high speed protocol 2 782 of FIG. 7C is formed by an SDH framer/deframer and in which the high speed protocol 1 780 of FIG. 7D is formed by a Gigabit Ethernet switching fabric. In accordance with example implementations, the SDH framer/deframer blocks 782 may be 622 Mbps and may be designed in Verilog hardware design language (VHDL) or another hardware description language.

In general, the Ethernet packets are encapsulated, or extracted, from the SDH frames. Therefore, the communication with the copper telemetry sections are based on Ethernet packets. In this connection, the FPGA 773 (or microprocessor) runs the MAC layer of the Ethernet. For purposes of coupling the Gigabit Ethernet switch switching fabric 780 to the SDH framer/deframer blocks 782 running at 622 Mbps, the speed of the Gigabit Ethernet switching fabric 780 is reduced. For example, commercially off-the-shelf Gigabit Ethernet switches may run at 125 Mhz, whereas for the exemplary implementation of FIG. 7D, the Gigabit Ethernet switching fabric 780 may run at 77.76 Mhz. This provides a smooth connection (without congestion and overflow) between the SDH framer/deframer blocks 782 and the Gigabit Ethernet switching fabric 780.

The advantages of having two high speed protocols may be the following, in accordance with example implementations. SDH has a precision time synchronization mechanism built into it which allows the concentrators to synchronize their RTCs to the GPS time. It is noted that commercially available off-the-shelf Fast Ethernet devices are available to perform RTC synchronization based on IEEE1588 Standard (Standard for a Precision Clock Synchronization Protocol for Networked Measurement and Control Systems). SDH scales in steps of four and not in steps of 10 as Ethernet does. Therefore, to make the system scalable, the system may run at 2.488 Gbps (rather than of 10 Gbps of the next Ethernet upgrade). This is important due to the performance limitations of the FPGAs and other components at high speeds, running at high temperature environment of oilfield borehole. And finally, as will be described later, most surface equipment and computing engines have standard Ethernet connections. And therefor, Ethernet packet based communication of data becomes an important part of this implementation at a system level.

Figure 8C:
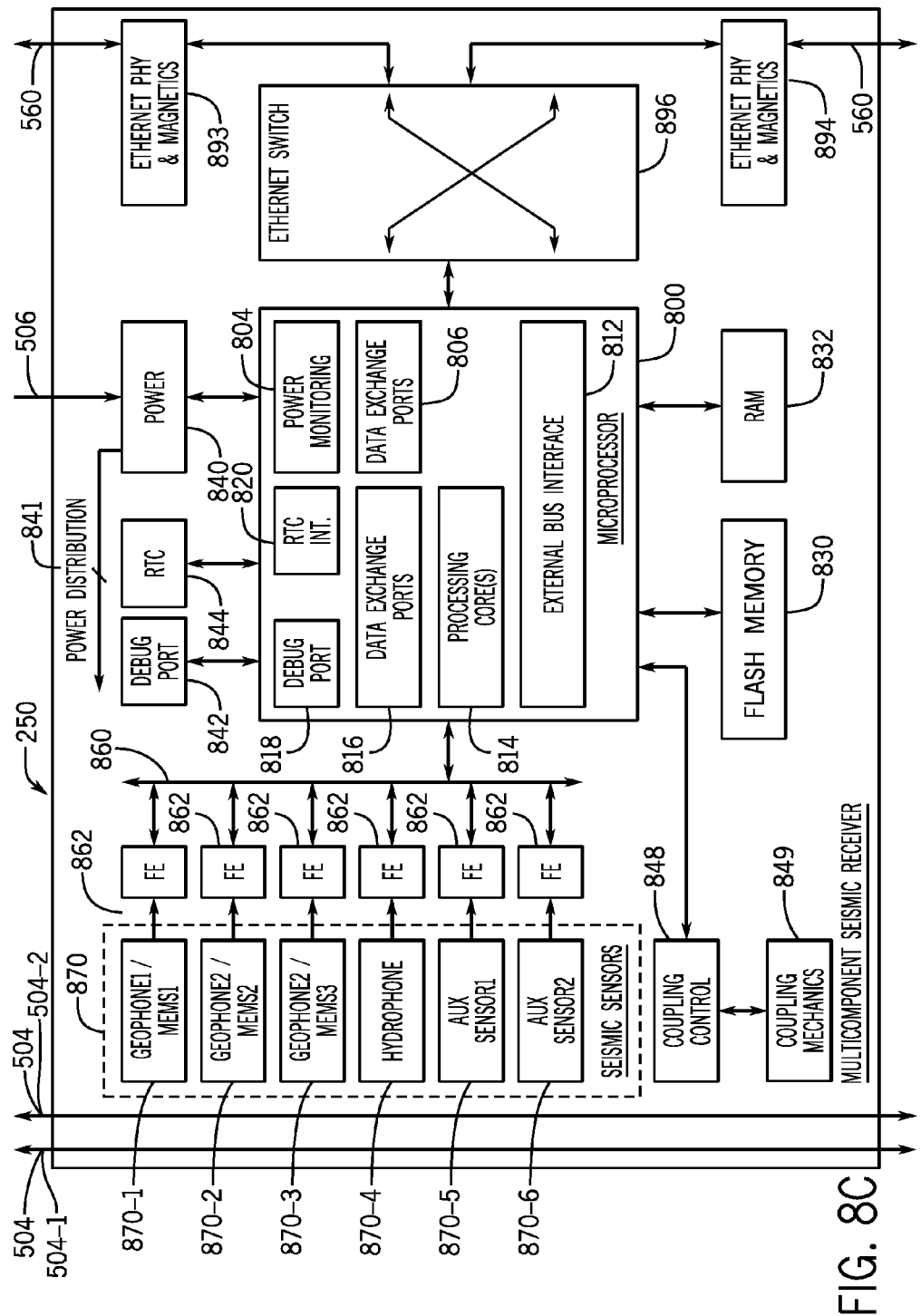
Figure 8D:
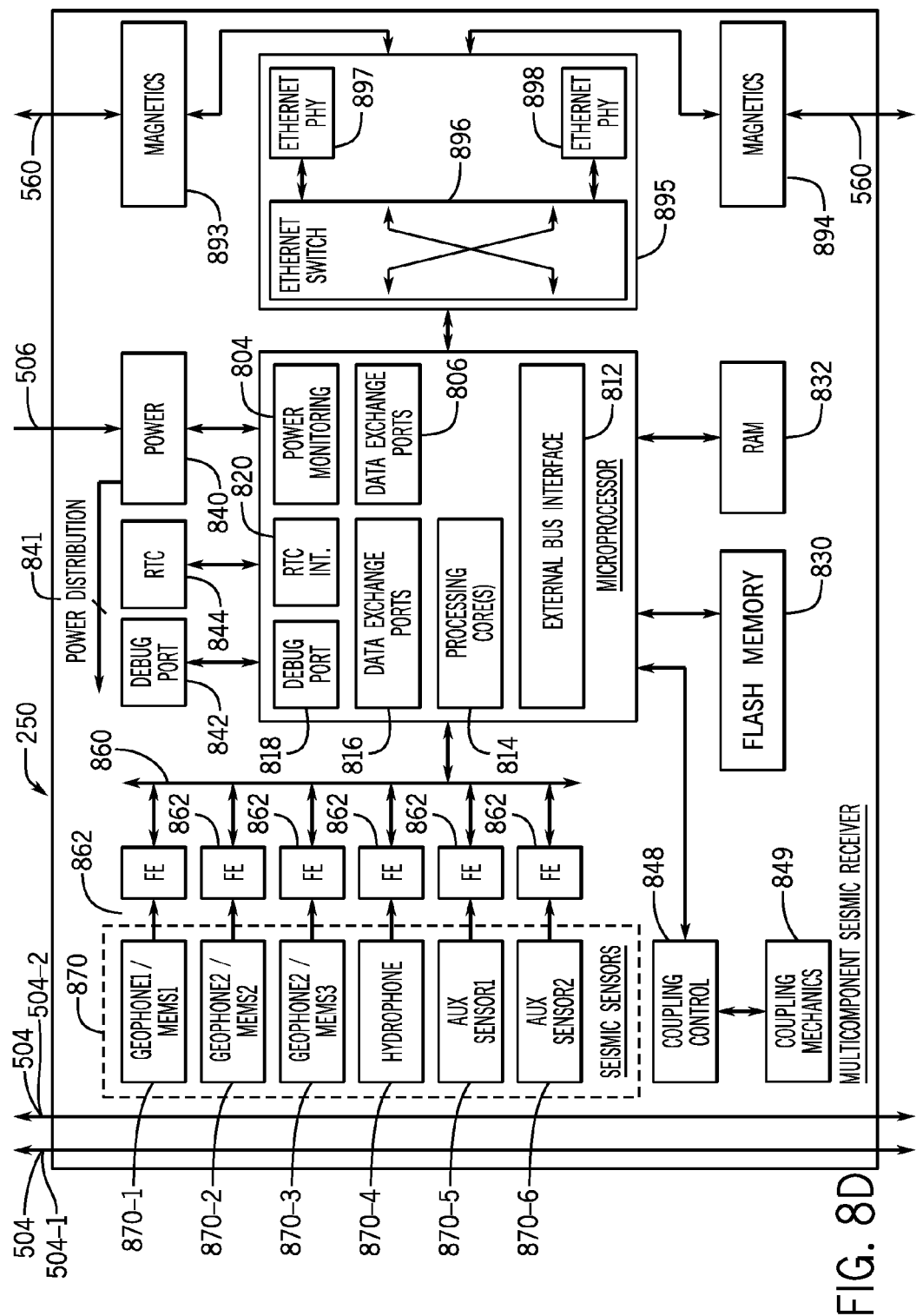

FIGS. 8C and 8D depict further exemplary implementations of the receiver 250. Referring to FIG. 8C, for this implementation, the receiver 250 has Fast Ethernet switching fabric 896 that is coupled to Ethernet physical and magnetic components 893 and 894 and is coupled on the other side to microprocessor 800 (similar design with other microprocessor of FIG. 8A). The switching fabric 896 routes the Ethernet packets, and the microprocessor 800 runs the MAC layer of the Ethernet. Referring to FIG. 8D, in accordance with example implementations, a commercially off-the-shelf component may be used, which integrates the Ethernet physical layers of the units 893 and 894 and the Ethernet switching fabric 896 of FIG. 8C to produce the implementation of the receiver 250 that is depicted in FIG. 8D. Referring to FIG. 8D, for this implementation, the component includes physical Ethernet interfaces 897 and 898 and external magnetics (fillers, for example) 893 and 894.

As noted above, the concentrators 210 and receivers 250 have RTCs that are time synchronized with the GPS time. Seismic and micro-seismic data are timestamped with the RTC value synchronized with the GPS time. In order to do this, the exemplary implementation includes two clock domains. As will be described below, the GPS reference clock is residing on the surface and distributes the clock to the system through the fiber optic backbone.

In accordance with example implementations, a clock domain for synchronizing of RTCs reside on the concentrators 210. In this domain the RTC synchronization information is transmitted in the SDH headers (as a part of the protocol). After synchronizing concentrator's RTCs, the synchronized clock value is distributed from the concentrators to the Fast Ethernet sections via Ethernet packets.

In accordance with example implementations, a clock domain for synchronizing the RTCs resides on the receivers 250. The synchronized clock value received from concentrators is utilized in conjunction with the IEEE1588 Standard (Standard for a Precision Clock Synchronization Protocol for Networked Measurement and Control Systems), which is implemented in many COTS Fast Ethernet PHYs and switches. The SW part of the protocol will run on the receiver's microprocessor.

The RTC block may have numerous different designs in accordance with the various possible implementations, as can be appreciated by one of skill in the art. As an example, the RTC block may include a control loop to sustain a stable clock source over time. The RTC block may further include a voltage controlled oscillator (VCO). The control voltage of the VCO is generated by a DAC (Digital to Analog Convertor). Registers residing in a programmable device (such as a PLD or a FPGA), keep values of the current time, and track its drift by receiving regular sync values and signals over the telemetry system. Based on the measured drift, the DAC is controlled to adjust the frequency of the VCO and the GPS synchronized value of the RTC block within a given accuracy.

In accordance with example implementations, Transport Control Protocol (TCP)/Internet Protocol (IP) may be run over the entire system. In that case each unit (i.e. concentrator and receiver) is assigned an IP address using an address configuration protocol such as the DHCP (Dynamic Host Configuration Protocol). The Main DHCP server may reside on the surface system for the example implementations. Moreover, the concentrators may include DHCP clients to receive IP addresses from the surface system and DHCP servers to provide receivers with IP addresses. The receivers may include DHCP clients. A more static (and therefore simpler) distribution of the IP addresses may also be used, in accordance with further example implementations.

Figure 10:
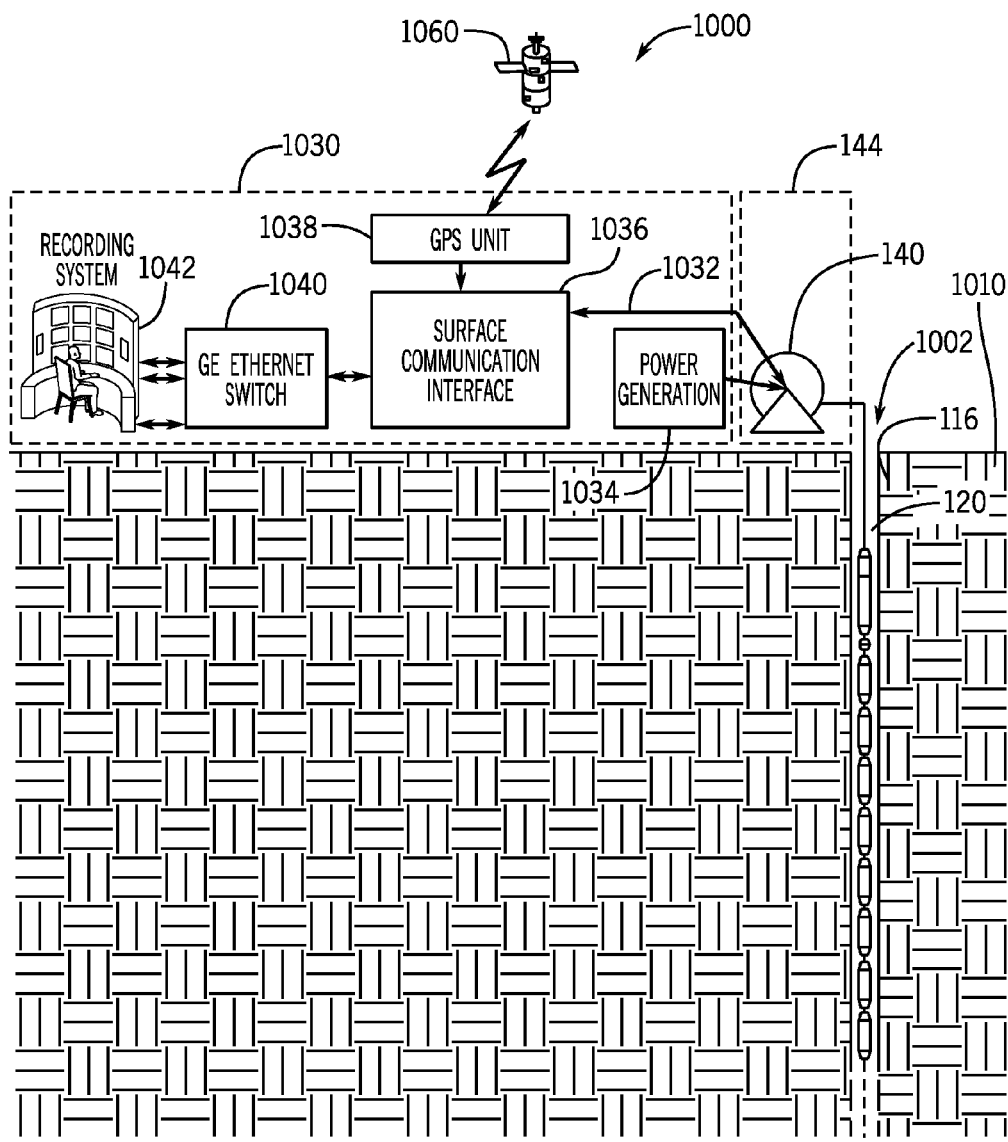
FIG. 10 is a more detailed schematic diagram of a surface system of FIG. 1 according to an example implementation.

FIG. 10 depicts a surface system 1000 for use with the scalable borehole seismic system according to example implementations. In further examples, the surface system 1000 includes the section reels 140 and the fibers and power wires of the scalable borehole acquisition system 120 interface with the surface system 1000 through a hybrid (i.e., electrical and optical) slip ring 146 (see FIG. 1) that resides on a drive unit 144 for the section reel 140.

Amend its other components 1030, the surface system 1000 includes a power generation module 1034 that provides AC and/or DC voltages to the entire array of receivers 250 and concentrators 210. In accordance with example implementations, the power generation unit 1034 may include a power generator along with AC/DC conversion circuitry.

Figure 11:
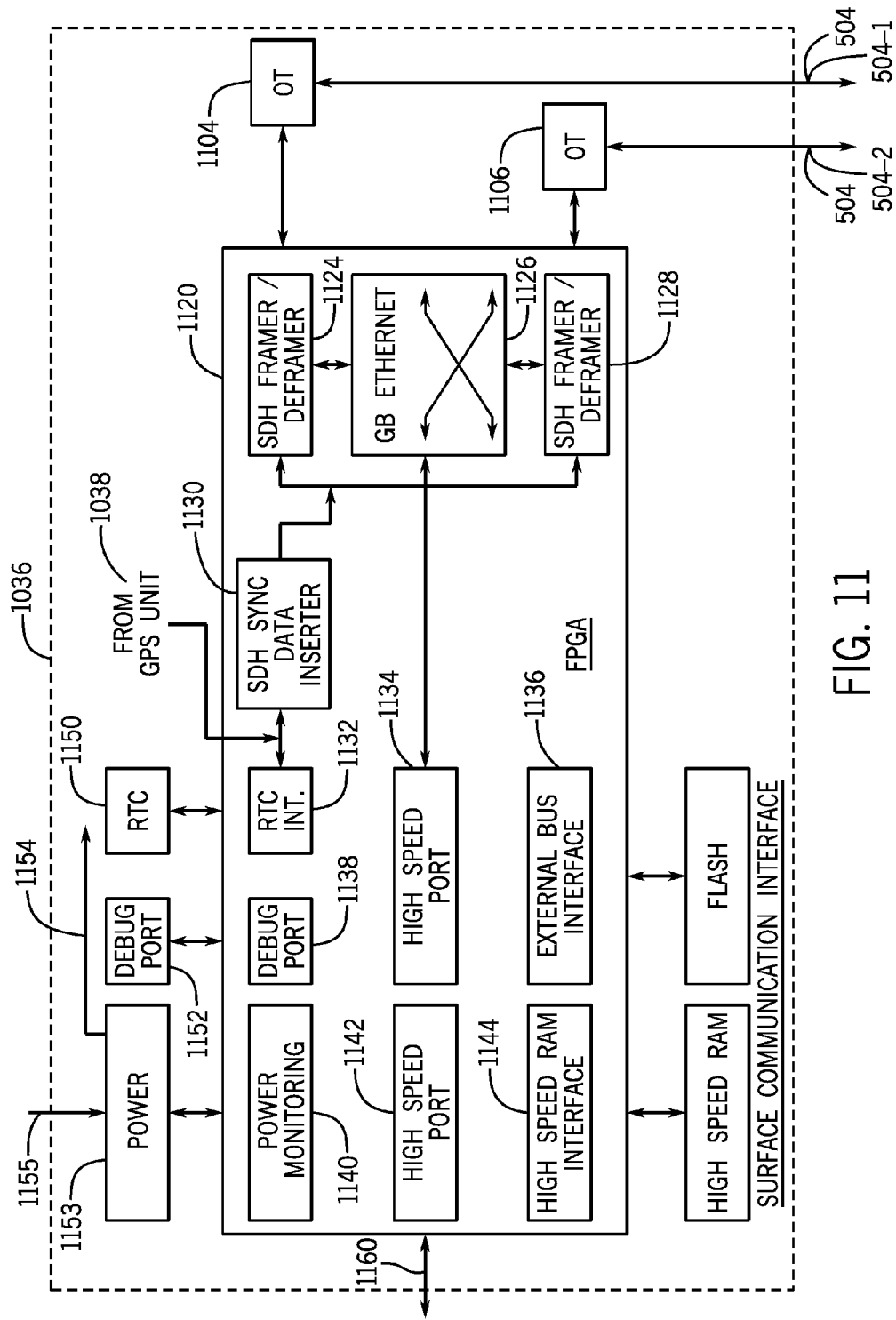
FIG. 11 is a schematic diagram of a surface communication interface of the surface system of FIG. 10 according to an example implementation.

The surface system 1000 further includes a surface communication interface 1036, which is depicted in FIG. 11. Referring to FIG. 11, in accordance with example implementations, the surface communication interface 1036 has an architecture that is similar to the architecture of the concentrator 210. In accordance with example implementations, the surface communication interface 1036 includes an FPGA 1120 that communicates with the optical fibers 504-1 and 504-2 via optical transceivers 1104 and 1106, respectively; and the FPGA 1120 furnishes the extracted data (via a link 1160) to a Gigabit Ethernet switch 1040 (see FIG. 10).

The FPGA 1120 includes an SDH synchronization data inserter 1130, which receives synchronization signals from the GPS unit 1038 and uses the synchronization signals to synchronize its own RTC to the GPS time. The SDH synchronization data inserter 1130 manipulates the output of the RTC interface block 1138 to generate synchronization information that is entered into SDH packet headers and distributed to the system via the optical transceivers 1104 and 1106. SDH framer/deframers 1124 and 1128 and a Gigabit Ethernet switch 1126 operate similar to the corresponding components of the concentrator 210. In this manner, similar to the concentrator 210, these components continuously monitor the quality of the data received from both fibers 504-1 and 504-2 and selects the one with the lower bit error rate. Similar to the concentrator, the circuitry also transmits the same data on both fibers.

Among its other features, the FPGA 1130 may, in accordance with example implementations, include components similar to the concentrator 210, such as a power monitoring interface 1140; a debugging port 1138; an RTC interface 1132; high speed ports 1134 and 1142; a high speed RAM interface 1144; and an external bus interface 1136. Moreover, as depicted in FIG. 11, the FPGA 1130 may be coupled to a high speed RAM and a flash memory 1139.

Referring back to FIG. 10, the Gigabit Ethernet switch 1040 has one port on one side connected to the synchronization and Gigabit Ethernet packet extraction unit and several ports on the other side that are connected to different servers performing difference tasks, residing on a recording system 1042. The routing of data to and from the servers is performed based on a routing protocol that is implemented on the switch 1040, in accordance with example implementations. Open Shortest Path First (OSPF) is an example of the protocol that uses IP addresses to route the data.

In accordance with example implementations, the recording system 1042 includes several servers and a field crew. The crew is responsible for controlling the deployment of the system, motion control parts of the system, powering up/off the system, testing the system during the deployment and monitoring the healthiness of the system. The crew is also responsible for recording and pre-processing the data, which at a later stage is sent to a processing center for post-processing and interpretation.

Traditional systems may use a computer that executes applications in a sequential manner to record and pre-process the data. However, in accordance with example implementations, the use of a multi-server system may run several applications in parallel. Due to the added computation power, this allows for further analysis of the acquired data beyond pre-processing. A more comprehensive analysis of data at the well site eliminates any lost time due to discovery of "bad" data (at a later time) and costly repetition of the measurement by re-deployment The dynamic addressing mechanism (such as OSPF) running on the Gigabit Ethernet switch allows the data to be routed to several servers and allows parallel applications to be run on the measurement data.

Prior to the deployment of the scalable borehole acquisition system 120, each receiver section 220 may be assembled in the workshop, and tested separately (for quality insurance) and stored on one of the section reels 140 hereafter referred to as a "section reel" prior to transportation to the well site. Due to the size of the system and limitation of the size of one single reel (the reels need to be portable and light enough to be rotated by a motor of the drive unit 144), several section reels 140 are used. During the deployment of the system, the section reels 140 are used one at a time. The section reel 140 may be shifted by using a crane operation when its content (i.e. a receiver section 230) is lowered in the well.

After the deployment of the section 220 for the last section reel 140, the last receiver section 230 is connected to another reel 152 (see FIG. 1) that holds the long range telemetry cable 201 (see FIG. 2), which at one end is connected to the top concentrator 210-1 (see FIG. 2) (i.e., connected to the logging head of the top concentrator).

Referring back to FIG. 1, thus, in accordance with example implementations, the surface system includes two types of reels: section reels 140 and a single long range telemetry cable reel 152 (i.e., the reel for the segment 201 of FIG. 2). Both of these reels 140 and 152 have hybrid slip rings. The section reel 140 resides on a drive unit 144 that contains a lateral shifter. The end of the long range telemetry cable 201 on the reel 152 is connected to another slip ring, which resides on the holder for the long range telemetry cable reel 152. This slip ring connects the array of receivers and concentrators to the surface system 1030, as depicted in FIG. 10.

In accordance with example implementations, the reels 140 and 152 are "active" reels, i.e. controlled by motors.

Still referring to FIG. 1, in accordance with example implementations, the surface system includes a de-tensioner 134, which is used due to the significantly increased weight of the scalable borehole acquisition system 120. The de-tensioner 134 helps drive the cable and controls its tension. In accordance with example implementations, the surface system may also include tension devices 132 and passive sheaves 130.

While a limited number of examples have been disclosed herein, those skilled in the art, having the benefit of this disclosure, will appreciate numerous modifications and variations therefrom. It is intended that the appended claims cover all such modifications and variations.

What is claimed is:

1. A method usable with a well, the method comprising:
deploying microelectromechanical system (MEMS)-based seismic receivers in the well via a cable, the cable including a first portion extending between the respective MEMS-based seismic receivers and a second portion extending between the MEMS-based seismic receivers and a surface external to the well, the first portion including a first transmission material different than a second transmission material of the second portion, the second transmission material extending from the second portion to the first portion; and
acquiring data indicative of seismic energy via the MEMs-based receivers and the cable.

2. The method of claim 1, wherein the MEMS-based seismic receivers include MEMS-based accelerometers.

3. The method of claim 1, wherein the data is indicative of energy produced by at least one active seismic source.

4. The method of claim 1, wherein the acquiring is performed in association with a microseismic acquisition.

5. The method of claim 1, wherein the MEMS-based receivers are disposed on the cable.

6. The method of claim 1, wherein the deploying of the MEMS-based receivers includes deploying the MEMS-based receivers in groups and the method further comprises deploying a plurality of concentrators associated with the groups, wherein a given concentrator is adapted to acquire data from an associated group of the MEMS-based receivers and to introduce the data into a telemetry network at a node of the telemetry network.

7. The method of claim 6, wherein the plurality of concentrators includes a first concentrator, the second portion of the cable to extend from the first concentrator to the surface.

8. The method of claim 1, wherein the first transmission material includes copper wires.

9. The method of claim 1, further comprising providing power downhole via the cable.

10. An apparatus for use with a well, the apparatus comprising:
a cable to be deployed in the well; and
microelectromechanical systems (MEMS)-based seismic sensors disposed on a first portion of the cable, the cable including a second portion extending between the MEMS-based sensors and a surface external to the well, the first portion including a first transmission material different than a second transmission material of the second portion, the second transmission material extending from the second portion to the first portion.

11. The apparatus of claim 10, wherein at least one of the MEMS-based seismic sensors comprises an accelerometer.

12. The apparatus of claim 10, wherein at least some of the MEMS-based sensors are deployed as a unit, the MEMS-based seismic sensors of the unit having sensitive axes along orthogonal axes.

13. The apparatus of claim 10, wherein the first transmission material includes copper wires.

14. The apparatus of claim 10, wherein the second transmission material includes an optical fiber.

15. The apparatus of claim 14, wherein the optical fiber is to pass through at least one of the MEMS-based sensors along the first portion of the cable.

16. The apparatus of claim 10, further including a plurality of concentrators disposed in the well, the concentrators to communicate with the MEMS-based seismic sensors via the first transmission material of the first portion of the cable.

17. The apparatus of claim 16, wherein the concentrators are to communicate with the surface via the second transmission material of the second portion of the cable.

18. The apparatus of claim 17, wherein respective ones of the plurality of the concentrators are to communicate with one another via the second transmission material along the first portion of the cable.

19. The apparatus of claim 16, wherein the plurality of concentrators includes a first concentrator, the second portion of the cable to extend from the first concentrator to the surface.

20. The apparatus of claim 10, wherein the first transmission material is associated with a first transmission speed and the second transmission material is associated with a second transmission speed, the first transmission speed slower than the second transmission speed.

* * * * *